(12) United States Patent
Wu et al.

(10) Patent No.: US 12,439,279 B2
(45) Date of Patent: Oct. 7, 2025

(54) REPORT TRANSMISSION METHOD, APPARATUS, AND SYSTEM

(71) Applicant: HUAWEI TECHNOLOGIES CO., LTD., Shenzhen (CN)

(72) Inventors: Yedan Wu, Shanghai (CN); Tingting Geng, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 388 days.

(21) Appl. No.: 18/146,542

(22) Filed: Dec. 27, 2022

(65) Prior Publication Data

US 2023/0132815 A1 May 4, 2023

Related U.S. Application Data

(63) Continuation of application No. PCT/CN2021/098201, filed on Jun. 3, 2021.

(30) Foreign Application Priority Data

Jun. 30, 2020 (CN) .......................... 202010614394.5

(51) Int. Cl.
*H04W 24/02* (2009.01)
*H04W 24/10* (2009.01)

(52) U.S. Cl.
CPC ........... *H04W 24/02* (2013.01); *H04W 24/10* (2013.01)

(58) Field of Classification Search
CPC ..... H04W 24/10; H04W 24/02; H04W 24/08; Y02D 30/70
See application file for complete search history.

(56) References Cited

U.S. PATENT DOCUMENTS

| | | | |
|---|---|---|---|
| 2010/0190488 A1* | 7/2010 | Jung | H04W 24/10 455/67.11 |
| 2014/0226501 A1 | 8/2014 | Zhou et al. | |

(Continued)

FOREIGN PATENT DOCUMENTS

CN 110362445 A 10/2019

OTHER PUBLICATIONS

Samsung, MDT context handing during hanover. 3GPP TSG RAN WG2 #73, Feb. 21-25, 2011, Taipei, Taiwan, R2-111223, 3 pages.

(Continued)

*Primary Examiner* — Mahran Y Abu Roumi
(74) *Attorney, Agent, or Firm* — HAUPTMAN HAM, LLP

(57) ABSTRACT

A report transmission method includes determining a quantity of target reports and, in response to the quantity of target reports being greater than or equal to a first quantity, sending a first report to a first network device. The first report includes one or more target reports. A type of the target report is a first type that includes one or more of an advance measurement report, a logged minimization of drive tests report, an accessibility failure report, a random access report, a radio link failure report, a mobility history report, or a radio link failure-like report. The radio link failure-like report is for logging a first event and/or a second event. The first event is when a quantity of data retransmissions of a terminal device is greater than or equal to a first preset quantity of times and less than a second preset quantity of times.

20 Claims, 6 Drawing Sheets

(56) References Cited

U.S. PATENT DOCUMENTS

2017/0094545 A1    3/2017  Subrahmanya et al.
2019/0082393 A1*  3/2019  Burugupalli ...... H04W 52/0261

OTHER PUBLICATIONS

3GPP TS 38.215 V16.1.0 (Mar. 2020), 3rd Generation Partnership Project; Technical Specification Group Radio Access Network; NR; Physical layer measurements(Release 16), 22 pages.
3GPP TS 38.133 V16.3.0 (Mar. 2020), 3rd Generation Partnership Project; Technical Specification Group Radio Access Network; NR; Requirements for support of radio resource management(Release 16), 1170 pages.
3GPP TS 38.331 V16.0.0 (Mar. 2020), 3rd Generation Partnership Project; Technical Specification Group Radio Access Network; NR; Radio Resource Control (RRC) protocol specification(Release 16), 835 pages.
3GPP TS 38.300 V16.1.0 (Mar. 2020), 3rd Generation Partnership Project; Technical Specification Group Radio Access Network; NR; NR and NG-RAN Overall Description; Stage 2(Release 16), 133 pages.
3GPP TR 38.821 V16.0.0 (Dec. 2019), 3rd Generation Partnership Project; Technical Specification Group Radio Access Network; Solutions for NR to support non-terrestrial networks (NTN)(Release 16), 140 pages.
International Search Report issued in corresponding International Application No. PCT/CN2021/098201, dated Sep. 3, 2021, pp. 1-8.

* cited by examiner

REPORT TRANSMISSION METHOD, APPARATUS, AND SYSTEM

CROSS-REFERENCE TO RELATED APPLICATIONS

This application is a continuation of International Application No. PCT/CN2021/098201, filed on Jun. 3, 2021, which claims priority to Chinese Patent Application No. 202010614394.5, filed on Jun. 30, 2020. The disclosures of the aforementioned applications are hereby incorporated by reference in their entireties.

TECHNICAL FIELD

This application relates to the communications field, and in particular, to a report transmission method, an apparatus, and a system.

BACKGROUND

A non-terrestrial network (NTN) is a network in which a base station or some base station functions are deployed on a high altitude platform station or a satellite to provide seamless coverage for a terminal device. With convergence of the NTN and 5th generation (5G) technologies, various measurement mechanisms in a terrestrial network are introduced into the NTN, so that the NTN network optimizes coverage of the NTN network based on a report. This is an important direction for future development of communication.

An existing report for optimizing terrestrial network coverage usually includes a logged minimization of drive tests (MDT) report, an accessibility failure report, a radio link failure (RLF) report, and the like. When a terminal device switches to radio resource control (RRC) connected mode (RRC_CONNECTED), the terminal device may first send indication information to a network to indicate that the terminal device has a measurement report that needs to be sent, and then send the measurement report of this type to the network.

In a process of introducing the measurement mechanism in the terrestrial network into the NTN, sending of various types of reports is inevitable. Therefore, it is necessary to design a proper solution to implement the sending of the reports in the NTN network.

SUMMARY

Embodiments of this application provide a report transmission method, an apparatus, and a system, to reduce power consumption of a terminal device and improve resource utilization.

To achieve the foregoing objectives, the following technical solutions are used in embodiments of this application.

According to a first aspect, a report transmission method is provided. The method may be performed by a terminal device, or may be performed by a component of the terminal device, for example, a processor, a circuit, a chip, or a chip system of the terminal device. In this application, an example in which the method is performed by the terminal device is used for description. The method includes: The terminal device determines a quantity of target reports; and when the quantity of target reports is greater than or equal to a first quantity, sends a first report to a first network device, where the first report includes one or more target reports.

Based on this solution, when the quantity of target reports logged by the terminal device is greater than or equal to the first quantity, the terminal device sends the first report to the first network device, to reduce frequency of sending the target report by the terminal device, so that power consumption of the terminal device is reduced. In addition, because the frequency of sending the target report by the terminal device can be reduced, resources occupied by sending the target report can be reduced, so that the terminal device transmits service data by using more resources after accessing a network device, to improve resource utilization.

In some possible designs, a type of the target report is a first type, and the first type includes one or more of the following: an advance measurement report, a logged minimization of drive tests MDT report, an accessibility failure report, a random access report, a radio link failure report, a mobility history report, or a radio link failure-like report, where the radio link failure-like report is for logging a first event and/or a second event, the first event means that a quantity of data retransmissions of the terminal device is greater than or equal to a first preset quantity of times and is less than a second preset quantity of times, the second event means that the terminal device performs handover, and duration from a moment at which the terminal device receives a handover command to a moment at which the terminal device successfully accesses a target cell is greater than or equal to first preset duration and is less than second preset duration. Based on this solution, a report of the first type may be sent when a quantity of reports of the first type is greater than or equal to the first quantity, to reduce frequency of sending the report of the first type.

In some possible designs, the target report is logged by the terminal device in a first time period.

In some possible designs, the method may further include: The terminal device receives first time information from a second network device, where the first time information indicates the first time period. Based on this solution, the terminal device may determine the target report based on the first time information. For example, the terminal device may determine that the target report is the report of the first type logged by the terminal device in the first time period indicated by the first time information.

In some possible designs, the method may further include: The terminal device receives first type information from the second network device, where the first type information indicates the first type. Based on this solution, the terminal device may determine the type of the target report based on the first type information.

In some possible designs, the method may further include: The terminal device receives the first quantity from the second network device. Based on this solution, the network device may configure a condition for determining whether to send the first report, to improve flexibility of transmitting the first report. For example, different first quantities may be configured for the terminal device in different scenarios.

In some possible designs, before the terminal device sends the first report to the first network device, the method may further include: sending indication information to the first network device, where the indication information indicates that the terminal device has the target report and/or the quantity of target reports.

In some possible designs, the method may further include: The terminal device receives request information from the first network device, where the request information is for requesting the terminal device to send the first report. That the terminal device sends the first report to the first network device may include: The terminal device sends the first report to the first network device based on the request information. Based on this solution, the terminal device may send a first report based on a request from the first network device, so that a case in which the terminal device sends the first report to the first network device without a request when the first network device does not need the first report can be avoided. In this way, the terminal device can be prevented from sending an unnecessary first report, the power consumption of the terminal device is reduced, and resources are saved.

In some possible designs, the method may further include: receiving first information from the first network device, and determining the first report based on the first information, where a quantity of target reports included in the first report is a second quantity.

In some possible designs, the first information includes the second quantity.

In some possible designs, the first information includes second time information, the second time information indicates a second time period, and the second quantity is a quantity of target reports logged by the terminal device in the second time period. Alternatively, the first information includes second type information, the second type information indicates a second type, and the second quantity is a quantity of target reports of the second type. Alternatively, the first information includes second time information and second type information, the second type information indicates a second type, the second time information indicates a second time period, and the second quantity is a quantity of target reports of the second type that are logged by the terminal device in the second time period.

Based on this solution, the first network device can indicate, to the terminal device, a report required by the first network device, to prevent the terminal device from sending another report that is not required by the first network device, so that a resource waste is reduced and resource utilization is improved.

In some possible designs, the method may further include: The terminal device logs a second report, where the second report includes a first value N, the first value is a quantity of times that the first event occurs in a third time period, and the first event means that the quantity of data retransmissions of the terminal device is greater than or equal to the first preset quantity of times and is less than the second preset quantity of times. The terminal device uses the second report as the target report.

In other words, the second report may log, in a period of time, a case in which a quantity of data retransmissions is large but no RLF occurs, and may reflect a case of continuous poorness of signal quality, so that the network device performs optimization for this case, to improve network performance and user experience.

In some possible designs, the second report further includes N second values, and an $i^{th}$ second value is a quantity of data retransmissions of the terminal device in an $i^{th}$ first event that occurs in the third time period, where i is a positive integer from 1 to N.

In some possible designs, the method may further include: The terminal device logs a third report, where the third report includes a third quantity of times a third value M, the third value is a quantity of times that the second event occurs in a fourth time period, and the second event means that the terminal device performs handover, and the duration from the moment at which the terminal device receives the handover command to the moment at which the terminal device successfully accesses the target cell is greater than or equal to the first preset duration and is less than the second preset duration. The terminal device uses the third report as the target report.

In other words, the third report may log, in a period of time, a case in which handover takes a long time period but no HOF occurs, and may reflect a case in which a target cell is not properly selected or network coverage quality of a target cell is poor, so that the network device performs optimization for this case, to improve network performance and user experience.

In some possible designs, the third report further includes information indicating the fourth time period, and/or M first duration, where $j^{th}$ first duration is duration, in a $j^{th}$ second event that occurs in the fourth time period, from a moment at which the terminal device receives a handover command to a moment at which the terminal device successfully accesses a target cell, and j is a positive integer from 1 to M.

According to a second aspect, a report transmission method is provided. The method may be performed by a second network device, or may be performed by a component of the second network device, for example, a processor, a circuit, a chip, or a chip system of the second network device. In this application, an example in which the method is performed by the second network device is used for description. The method includes: The second network device obtains a first quantity, where the first quantity is used to configure a terminal device to send a first report when a quantity of target reports is greater than or equal to the first quantity, and the first report includes one or more target reports; and sends the first quantity to the terminal device.

Based on this solution, when the quantity of logged target reports is greater than or equal to the first quantity, the terminal device sends the first report to a first network device based on an indication of the second network device, to reduce frequency of sending the target report by the terminal device, so that power consumption of the terminal device is reduced. In addition, because the frequency of sending the target report by the terminal device can be reduced, resources occupied by sending the target report can be reduced, so that the terminal device transmits service data by using more resources after accessing a network device, to improve resource utilization.

In some possible designs, a type of the target report is a first type, and the first type includes one or more of the following: an advance measurement report, a logged minimization of drive tests MDT report, an accessibility failure report, a random access report, a radio link failure report, a mobility history report, or a radio link failure-like report, where the radio link failure-like report is for logging a first event and/or a second event, the first event means that a quantity of data retransmissions of the terminal device is greater than or equal to a first preset quantity of times and is less than a second preset quantity of times, the second event means that the terminal device performs handover, and duration from a moment at which the terminal device receives a handover command to a moment at which the terminal device successfully accesses a target cell is greater than or equal to first preset duration and is less than second preset duration.

In some possible designs, the target report is logged by the terminal device in a first time period.

In some possible designs, the method may further include: The second network device sends first time information to the terminal device, where the first time information indicates the first time period.

In some possible designs, the method may further include: The second network device sends first type information to the terminal device, where the first type information indicates the first type.

According to a third aspect, a report transmission method is provided. The method may be performed by a first network device, or may be performed by a component of the first network device, for example, a processor, a circuit, a chip, or a chip system of the first network device. In this application, an example in which the method is performed by the first network device is used for description. The method includes: The first network device receives a first report from a terminal device, where the first report includes one or more target reports. The first network device processes the first report. For a technical effect of the third aspect, refer to the technical effect described in the first aspect. Details are not described herein again.

In some possible designs, a type of the target report is a first type, and the first type includes one or more of the following: an advance measurement report, a logged minimization of drive tests MDT report, an accessibility failure report, a random access report, a radio link failure report, a mobility history report, or a radio link failure-like report, where the radio link failure-like report is for logging a first event and/or a second event, the first event means that a quantity of data retransmissions of the terminal device is greater than or equal to a first preset quantity of times and is less than a second preset quantity of times, the second event means that the terminal device performs handover, and duration from a moment at which the terminal device receives a handover command to a moment at which the terminal device successfully accesses a target cell is greater than or equal to first preset duration and is less than second preset duration.

In some possible designs, the target report is logged by the terminal device in a first time period.

In some possible designs, the method may further include: The first network device sends first time information to the terminal device, where the first time information indicates the first time period.

In some possible designs, the method may further include: The first network device sends first type information to the terminal device, where the first type information indicates the first type.

In some possible designs, the method may further include: The first network device sends first information to the terminal device, where the first information is for determining the first report, and a quantity of target reports included in the first report is a second quantity.

In some possible designs, the first information includes the second quantity.

In some possible designs, the first information includes second time information, the second time information indicates a second time period, and the second quantity is a quantity of target reports logged by the terminal device in the second time period. Alternatively, the first information includes second type information, the second type information indicates a second type, and the second quantity is a quantity of target reports of the second type. Alternatively, the first information includes second time information and second type information, the second type information indicates a second type, the second time information indicates a second time period, and the second quantity is a quantity of target reports of the second type that are logged by the terminal device in the second time period.

In some possible designs, the method may further include: The first network device sends request information to the terminal device, where the request information is for requesting the terminal device to send the first report.

In some possible designs, the method may further include: The first network device receives indication information from the terminal device, where the indication information indicates that the terminal device has the target report and/or the quantity of target reports. The first network device sends request information to the terminal device based on the indication information, where the request information is for requesting the terminal device to send the first report.

According to a fourth aspect, a report transmission method is provided. The method may be performed by a terminal device, or may be performed by a component of the terminal device, for example, a processor, a circuit, a chip, or a chip system of the terminal device. In this application, an example in which the method is performed by the terminal device is used for description. The method includes: The terminal device logs a second report, where the second report includes a first value N, the first value is a quantity of times that a first event occurs in a third time period, and the first event means that a quantity of data retransmissions of the terminal device is greater than or equal to a first preset quantity of times and is less than a second preset quantity of times. The terminal device sends the second report.

Based on this solution, because the second report may log, in a period of time, a case in which a quantity of data retransmissions is large but no RLF occurs, and may reflect a case of continuous poorness of signal quality, so that a network device performs optimization for this case, to improve network performance and user experience.

In some possible designs, the second report further includes N second values, and an $i^{th}$ second value is a quantity of data retransmissions of the terminal device in an $i^{th}$ first event that occurs in the third time period, where i is a positive integer from 1 to N.

According to a fifth aspect, a report transmission method is provided. The method may be performed by a terminal device, or may be performed by a component of the terminal device, for example, a processor, a circuit, a chip, or a chip system of the terminal device. In this application, an example in which the method is performed by the terminal device is used for description. The method includes: The terminal device logs a third report, where the third report includes a third quantity of times a third value M, the third value is a quantity of times that a second event occurs in a fourth time period, and the second event means that the terminal device performs handover, and duration from a moment at which the terminal device receives a handover command to a moment at which the terminal device successfully accesses a target cell is greater than or equal to first preset duration and is less than second preset duration. The terminal device sends the third report.

Based on this solution, because the third report may log, in a period of time, a case in which handover takes a long time period but no HOF occurs, and may reflect a case in which a target cell is not properly selected or network coverage quality of a target cell is poor, so that a network device performs optimization for this case, to improve network performance and user experience.

In some possible designs, the third report further includes information indicating the fourth time period, and/or M first duration, where $j^{th}$ first duration is duration, in a $j^{th}$ second event that occurs in the fourth time period, from a moment at which the terminal device receives a handover command to a moment at which the terminal device successfully accesses a target cell, and j is a positive integer from 1 to M.

According to a sixth aspect, a communication apparatus is provided, and is configured to implement the method according to any one of the foregoing aspects. In some implementations, the communication apparatus may be the terminal device in the first aspect, the fourth aspect, or the fifth aspect; an apparatus including the foregoing terminal device; or an apparatus, for example, a chip, included in the foregoing terminal device. Alternatively, in some other implementations, the communication apparatus may be the network device (the first network device or the second network device) in the second aspect or the third aspect, an apparatus including the foregoing network device, or an apparatus included in the foregoing network device. The communication apparatus includes a corresponding module, unit, or means for implementing the foregoing method. The module, unit, or means may be implemented by hardware, software, or hardware executing corresponding software. The hardware or the software includes one or more modules or units corresponding to the foregoing functions.

According to a seventh aspect, a communication apparatus is provided, including a memory and at least one processor. The memory is configured to store computer instructions. When the processor executes the instructions, the communication apparatus performs the method according to any one of the foregoing aspects. The communication apparatus may be the terminal device in the first aspect, the fourth aspect, or the fifth aspect; an apparatus including the foregoing terminal device; or an apparatus, for example, a chip, included in the foregoing terminal device. Alternatively, the communication apparatus may be the network device (the first network device or the second network device) in the second aspect or the third aspect, an apparatus including the foregoing network device, or an apparatus included in the foregoing network device.

According to an eighth aspect, a communication apparatus is provided, including an interface circuit and at least one processor. The interface circuit may be a code/data read/write interface circuit, and the interface circuit is configured to receive computer-executable instructions (where the computer-executable instructions are stored in a memory, and may be directly read from the memory, or may be read via another component) and transmit the computer-executable instructions to the processor. The processor is configured to run the computer-executable instructions to perform the method according to any one of the foregoing aspects. The communication apparatus may be the terminal device in the first aspect, the fourth aspect, or the fifth aspect; an apparatus including the foregoing terminal device; or an apparatus, for example, a chip, included in the foregoing terminal device. Alternatively, the communication apparatus may be the network device (the first network device or the second network device) in the second aspect or the third aspect, an apparatus including the foregoing network device, or an apparatus included in the foregoing network device.

According to a ninth aspect, a communication apparatus is provided, including at least one processor. The processor is configured to be coupled to a memory, and perform, according to instructions after reading the instructions in the memory, the method according to any one of the foregoing aspects. The communication apparatus may be the terminal device in the first aspect, the fourth aspect, or the fifth aspect; an apparatus including the foregoing terminal device; or an apparatus, for example, a chip, included in the foregoing terminal device. Alternatively, the communication apparatus may be the network device (the first network device or the second network device) in the second aspect or the third aspect, an apparatus including the foregoing network device, or an apparatus included in the foregoing network device.

According to a tenth aspect, a computer-readable storage medium is provided. The computer-readable storage medium stores instructions. When the instructions are run on a communication apparatus, the communication apparatus is enabled to perform the method according to any one of the foregoing aspects. The communication apparatus may be the terminal device in the first aspect, the fourth aspect, or the fifth aspect; an apparatus including the foregoing terminal device; or an apparatus, for example, a chip, included in the foregoing terminal device. Alternatively, the communication apparatus may be the network device (the first network device or the second network device) in the second aspect or the third aspect, an apparatus including the foregoing network device, or an apparatus included in the foregoing network device.

According to an eleventh aspect, a computer program product including instructions is provided. When the computer program product runs on a communication apparatus, the communication apparatus is enabled to perform the method according to any one of the foregoing aspects. The communication apparatus may be the terminal device in the first aspect, the fourth aspect, or the fifth aspect; an apparatus including the foregoing terminal device; or an apparatus, for example, a chip, included in the foregoing terminal device. Alternatively, the communication apparatus may be the network device (the first network device or the second network device) in the second aspect or the third aspect, an apparatus including the foregoing network device, or an apparatus included in the foregoing network device.

According to a twelfth aspect, a communication apparatus (where for example, the communication apparatus may be a chip or a chip system) is provided. The communication apparatus includes at least one processor, configured to implement a function in any one of the foregoing aspects. In a possible design, the communication apparatus further includes a memory. The memory is configured to store program instructions and/or data that are necessary. When the communication apparatus is the chip system, the communication apparatus may include a chip, or may include a chip and another discrete component.

For technical effects brought by any design scheme in the sixth aspect to the twelfth aspect, refer to technical effects brought by different design schemes in the first aspect, the second aspect, the third aspect, the fourth aspect, or the fifth aspect. Details are not described herein again.

According to a thirteenth aspect, a communication system is provided. The communication system includes the terminal device in the foregoing aspects and the second network device in the foregoing aspects.

According to a fourteenth aspect, a communication system is provided. The communication system includes the terminal device in the foregoing aspects and the first network device in the foregoing aspects.

According to a fifteenth aspect, a communication system is provided. The communication system includes the terminal device in the foregoing aspects, the first network device in the foregoing aspects, and the second network device in the foregoing aspects.

DESCRIPTION OF EMBODIMENTS

For ease of understanding of the technical solutions in embodiments of this application, the technologies related to this application are first briefly described as follows.

1. Radio Resource Control (RRC) Mode

In embodiments of this application, the RRC mode of a terminal device may be classified into RRC connected mode and RRC non-connected mode. When the terminal device is in RRC connected mode, there is an RRC connection between the terminal device and a network device. When the terminal device is in RRC non-connected mode, there is no RRC connection between the terminal device and the network device.

For example, RRC connected mode may include RRC connected (RRC_CONNECTED) mode, and the RRC non-connected mode may include at least one of RRC inactive (RRC_INACTIVE) mode and RRC idle (RRC_IDLE) mode.

It may be understood that, in this application, RRC non-connected mode is not limited to including only RRC inactive mode and RRC idle mode, and another RRC non-connected mode may appear in a future protocol.

A new radio (NR) system is used as an example. In NR, when a terminal device is in RRC connected mode, the terminal device has established connections to both an access network device and a core network device, and the terminal device may perform data transmission with a network. When the terminal device is in RRC inactive mode, the terminal device reserves links of the terminal device to the access network device and the core network device, and suspends the link between the terminal device and the access network device. In this case, the terminal device and the access network device store a context of the terminal device. When data needs to be transmitted, the terminal device may quickly resume the link between the terminal device and the access network device. When the terminal device is in RRC idle mode, the terminal device releases the link between the terminal device and the access network device and the link between the terminal device and the core network device.

Figure 1:
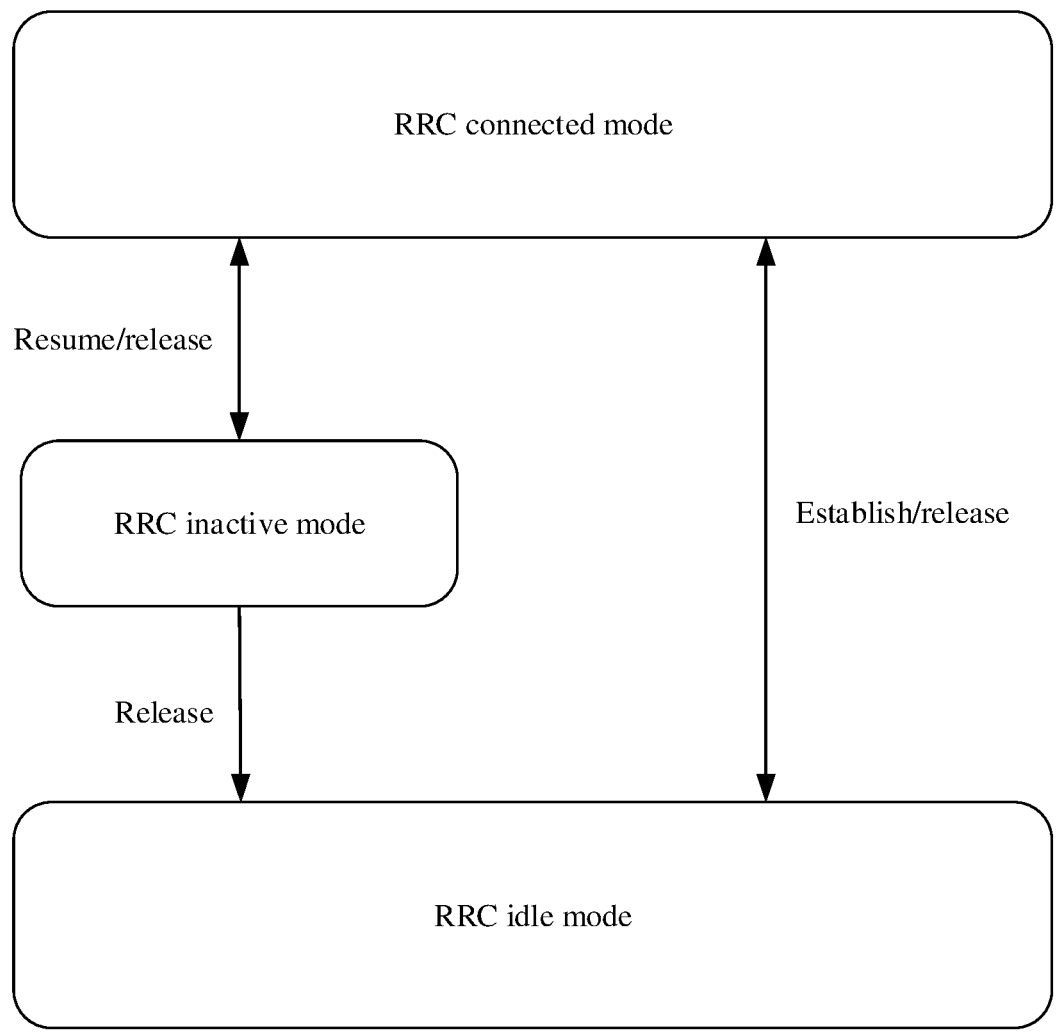
FIG. 1 is a schematic diagram of RRC mode switching of a terminal device according to an embodiment of this application.

For example, switching of the foregoing three modes may be shown in FIG. 1. When a terminal device is in RRC idle mode, the terminal device may enter RRC connected mode by establishing an RRC connection to a network device. When the terminal device is in RRC connected mode, the network device may release the RRC connection of the terminal device, and configure the terminal device to enter RRC inactive mode or RRC idle mode. When the terminal device is in RRC inactive mode, the terminal device may initiate an RRC connection resume request, and the network device may configure the terminal device to enter RRC connected mode or RRC idle mode.

It may be understood that the foregoing RRC mode is merely an example, and should not constitute any limitation on this application. This application does not exclude a case in which other possible names that have a same or similar feature are defined in a future protocol to replace the existing names, or another mode may appear.

2. Non-Terrestrial Network (NTN) Communication

The NTN communication may include satellite communication, and may mean that a base station or some base station functions are deployed on a satellite to provide coverage for a terminal device. The satellite communication has prominent advantages such as global coverage, long-distance transmission, flexible networking, convenient deployment, and being not restricted by geographical locations, and has been widely applied to a plurality of fields such as maritime communication, positioning and navigation, disaster relief, scientific experiments, video broadcasting, and earth observation.

Based on a satellite altitude, namely, a satellite orbit altitude, a satellite system may be classified into a highly elliptical orbit (HEO) satellite, a high-earth orbit (GEO) satellite, a medium earth orbit (MEO) satellite, and a low-earth orbit (LEO) satellite. The GEO satellite is also referred to as a stationary satellite, and a moving speed of the GEO satellite is the same as a rotation speed of the earth. Therefore, the GEO satellite remains stationary relative to the ground. Accordingly, a cell of the GEO satellite is also stationary. Coverage of the cell of the GEO satellite is large, and a diameter of the cell is usually 500 km. The LEO satellite moves fast relative to the ground at a speed of about 7 km per second. Therefore, service coverage provided by the LEO satellite also moves. Usually, a higher orbit of a satellite indicates larger coverage of the satellite but a longer communication delay.

In addition, the NTN communication may further include high altitude platform station (HAPS) communication, and means that a base station or some base station functions are deployed on the high altitude platform station to provide coverage for a terminal device.

3. Minimization of Drive Tests (MDT) Technology

To reduce data collection costs, the MDT technology in automatic measurement collection is introduced into a conventional technology to complete some conventional drive tests, to detect and optimize a problem or a fault in a wireless network. An application scenario of the MDT technology may include, for example, a scenario in which an operator usually performs routine network coverage drive tests every month, or a scenario in which some area-specific network coverage drive tests are performed in response to a user complaint.

In a possible classification method, measurement types of the MDT technology may be classified into the following types.

Signal level measurement: A terminal device measures a signal level of a radio signal, for example, reference signal received power (RSRP) or reference signal received quality (RSRQ), and reports a measurement collection result to a network device.

Quality of service (QoS) measurement (QoS measurement): A network device usually performs QoS measurement, for example, on a traffic volume of a service, an interne protocol (IP) throughput of a service, a packet loss rate of a service, or a processing delay of a service; and certainly, a terminal device may perform QoS measurement, for example, on an uplink processing delay. This is not specifically limited in embodiments of this application.

Accessibility measurement: A terminal device logs information such as a radio link failure (radio link failure, RLF) and an RRC connection access failure, and reports the information to a network device.

In another possible classification method, the MDT may include an immediate MDT and a logged MDT. The immediate MDT mainly means measurement for a terminal device in RRC connected mode, for example, measurement of a data volume, a packet transmission delay, a packet loss rate, and a processing delay that are of the terminal device. The logged MDT mainly means measurement for a terminal device in RRC non-connected mode. For example, the terminal device in RRC non-connected mode measures a cell that is on a frequency corresponding to a cell on which the terminal device currently camps, and/or measures an inter-frequency or inter-system neighboring cell that is broadcast in the cell on which the terminal device currently camps.

The following describes the technical solutions in embodiments of this application with reference to the accompanying drawings in embodiments of this application. In the descriptions of this application, unless otherwise specified, "/" indicates an "or" relationship between associated objects. For example, AB may indicate A or B. In this application, "and/or" describes only an association relationship between associated objects and indicates that three relationships may exist. For example, A and/or B may indicate the following three cases: Only A exists, both A and B exist, and only B exists, where A and B may be singular or plural. In addition, in the descriptions of this application, unless otherwise specified, "at least one" means one or more, and "a plurality of" means two or more. "At least one of the following items (pieces)" or a similar expression thereof refers to any combination of these items, including any combination of singular items (pieces) or plural items (pieces). For example, at least one item (piece) of a, b, or c may indicate a, b, c, a-b, a-c, b-c, or a-b-c, where "-" indicates that associated objects are in an "and" relationship, and a, b, and c may be singular or plural. In addition, to clearly describe the technical solutions in embodiments of this application, terms such as "first" and "second" are used in embodiments of this application to distinguish between same items or similar items that provide basically same functions or purposes. A person skilled in the art may understand that the terms such as "first" and "second" do not limit a quantity or an execution sequence, and the terms such as "first" and "second" do not indicate a definite difference.

The technical solutions in embodiments of this application may be applied to various communication systems, such as an orthogonal frequency division multiple access (OFDMA) system, a single carrier frequency division multiple access (single carrier FDMA, SC-FDMA) system, an NTN system, and another system. Terms "system" and "network" may be interchanged with each other. The OFDMA system may implement wireless technologies such as evolved universal terrestrial radio access (E-UTRA) and ultra mobile broadband (UMB). The E-UTRA is an evolved release of a universal mobile telecommunications system (UMTS). The 3rd generation partnership project (3GPP) uses a new release of the E-UTRA in long term evolution (LTE) and various releases evolved based on LTE. A 5th generation (5G) communication system is a next-generation communication system under study. The 5G communication system includes a 5G non-standalone (NSA) mobile communication system, a 5G standalone (SA) mobile communication system, or both a 5G NSA mobile communication system and a 5G SA mobile communication system. In addition, the communication systems may be further applied to a future-oriented communication technology, and are all applicable to the technical solutions provided in embodiments of this application. The foregoing communication systems used in this application are merely examples for description, and are not limited thereto. A general description is provided herein. Details are not described below again.

Figure 2:
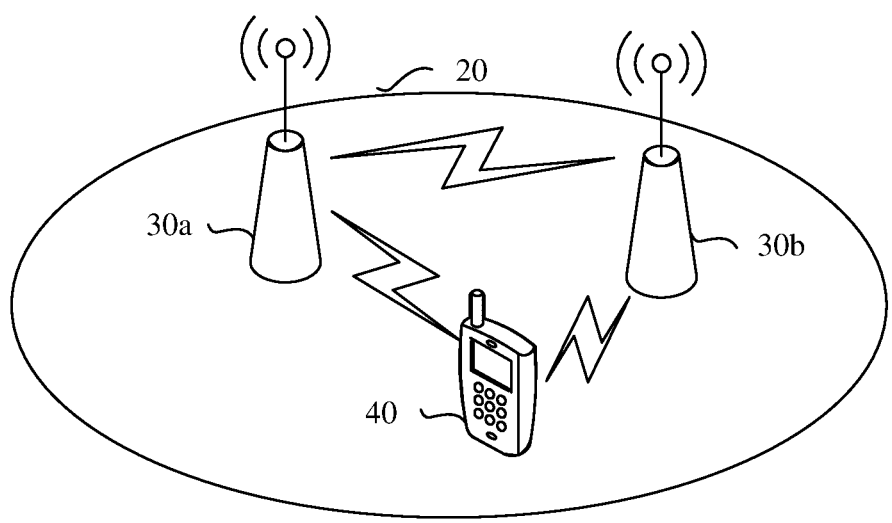
FIG. 2 is a schematic diagram of a structure of a communication system according to an embodiment of this application.

FIG. 2 shows a communication system 20 according to an embodiment of this application. The communication system 20 includes a first network device 30a, a second network device 30b, and a terminal device 40.

In this embodiment of this application, it is assumed that the terminal device 40 first establishes an RRC connection to the second network device 30b, and enters RRC non-connected mode after a period of time. Then, the terminal device 40 initiates an RRC connection to the first network device 30a, and accesses the first network device 30a.

It may be understood that the first network device 30a and the second network device 30b may be the same. In this case, the communication system provided in this embodiment of this application includes the first network device 30a and the terminal device 40, or includes the second network device 30b and the terminal device 40.

For example, as shown in FIG. 2, the first network device 30a and the second network device 30b communicate with the terminal device 40. In this embodiment of this application, the terminal device determines a quantity of target reports. When the quantity of target reports is greater than or equal to a first quantity, the terminal device sends a first report to the first network device, where the first report includes one or more target reports.

Based on this solution, when the quantity of target reports logged by the terminal device is greater than or equal to the first quantity, the terminal device sends the first report to the first network device, to reduce frequency of sending the target report by the terminal device, so that power consumption of the terminal device is reduced. In addition, because the frequency of sending the target report by the terminal device can be reduced, resources occupied by sending the target report can be reduced, so that the terminal device transmits service data by using more resources after accessing a network device, to improve resource utilization.

Alternatively, in this embodiment of this application, the second network device obtains a first quantity and sends the first quantity to the terminal device, where the first quantity is used to configure the terminal device to send a first report when a quantity of target reports is greater than or equal to the first quantity, and the first report includes one or more target reports.

In this solution, when the quantity of logged target reports is greater than or equal to the first quantity, the terminal device sends the first report to the first network device based on an indication of the second network device, to reduce frequency of sending the target report by the terminal device, so that power consumption of the terminal device is reduced. In addition, because the frequency of sending the target report by the terminal device can be reduced, resources occupied by sending the target report can be reduced, so that the terminal device transmits service data by using more resources after accessing a network device, to improve resource utilization.

Optionally, the network device (including the first network device 30a and the second network device 30b) in embodiments of this application is a device that connects the terminal device 40 to a wireless network, and may be an evolved NodeB (eNB, or eNodeB) in LTE, a base station in a 5G network or a future evolved public land mobile network (PLMN), a broadband network gateway (BNG), an aggregation switch, a non-3rd generation partnership project (3GPP) access device, or the like. This is not specifically limited in this embodiment of this application. Optionally, the base station in embodiments of this application may include various forms of base stations, for example, a macro base station, a micro base station (which is also referred to as a small cell), a relay station, an access point, a next-generation NodeB (gNodeB, gNB), a home base station (for example, a home evolved NodeB or a home NodeB, HNB), a baseband unit (BBU), a transmission reception point (TRP), a transmission point (TP), and a mobile switching center. This is not specifically limited in this embodiment of this application.

Optionally, the network device in embodiments of this application may be deployed on a high altitude platform station or a satellite. Optionally, when deployed on the high altitude platform station or the satellite, the network device may serve as a layer 1 (L1) relay, or may serve as a base station, or may serve as a distributed unit (DU), or may serve as an integrated access and backhaul (IAB) node.

In a possible manner, the network device in embodiments of this application may alternatively be a central unit (CU) or a distributed unit (DU), or the network device may include a CU and a DU. A plurality of DUs may share one CU. One DU may alternatively be connected to a plurality of CUs. It may be understood that the base station is divided into the CU and the DU from the perspective of a logical function. The CU and the DU may be physically split, or may be deployed together. This is not specifically limited in embodiments of this application. The CU and the DU may be connected through an interface, for example, an F1 interface. The CU and the DU may be obtained through division based on protocol layers of a wireless network. For example, functions of an RRC protocol layer, a service data adaptation protocol (SDAP) protocol layer, and a packet data convergence protocol (PDCP) protocol layer are set in the CU, and functions of a radio link control (RLC) protocol layer, a media access control (MAC) protocol layer, a physical (PHY) protocol layer, and the like are set in the DU.

It may be understood that processing function division of the CU and the DU based on the protocol layers is merely an example, and there may be other division.

For example, the CU or the DU may have functions of more protocol layers through division. For example, the CU or the DU may alternatively have some processing functions of the protocol layers through division. In a design, some functions of the RLC layer and functions of a protocol layer above the RLC layer are distributed in the CU, and remaining functions of the RLC layer and functions of a protocol layer below the RLC layer are distributed in the DU. In another design, functions of the CU or the DU may alternatively be obtained through division based on a service type or another system requirement. For example, division is performed based on a delay, a function whose processing time needs to satisfy a delay requirement is set in the DU, and a function whose processing time does not need to satisfy the delay requirement is set in the CU. In another design, the CU may alternatively have one or more functions of a core network. One or more CUs may be set in a centralized manner or a split manner. For example, the CUs may be set on a network side for ease of centralized management. The DU may have a plurality of radio frequency functions, or the radio frequency functions may be set remotely.

Optionally, the CU may include a CU control plane (CU-CP) and a CU user plane (CU-UP). It may be understood that the CU is divided into the CU-CP and the CU-UP from a perspective of logical functions. The CU-CP and the CU-UP may be obtained through division based on a protocol layer of a wireless network. For example, a function of an RRC protocol layer and a function that is of a PDCP protocol layer and that corresponds to a signaling radio bearer (SRB) are set in the CU-CP, and a function that is of the PDCP protocol layer and that corresponds to a data radio bearer (DRB) is set in the CU-UP. In addition, a function of an SDAP protocol layer may also be set in the CU-UP.

Figure 3:
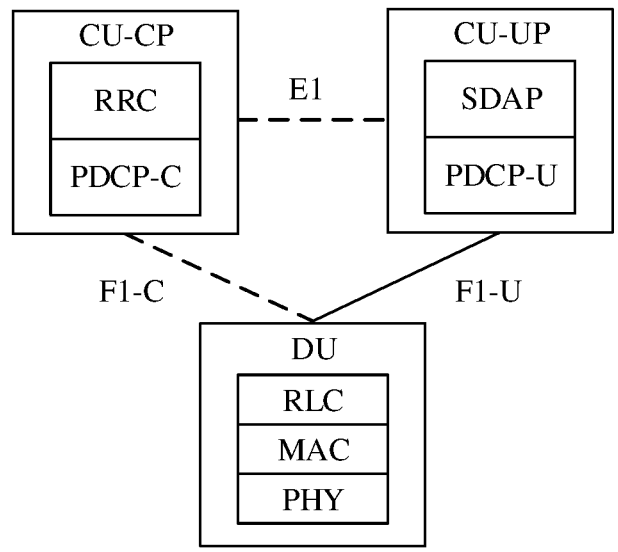
FIG. 3 is a schematic diagram of a structure of a network device according to an embodiment of this application.
Figure 4:
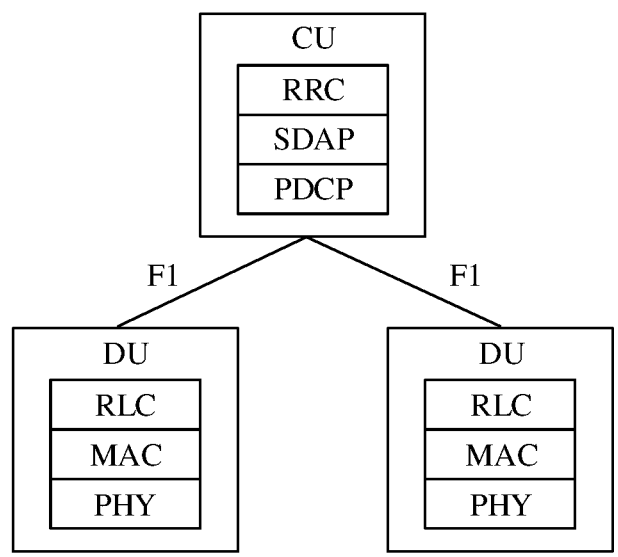
FIG. 4 is a schematic diagram of a structure of another network device according to an embodiment of this application.

For example, a network device includes a CU and a DU, and the CU includes a CU-CP and a CU-UP. FIG. 3 is a schematic diagram of a structure of the network device according to an embodiment of this application. A PDCP-C refers to a PDCP control plane, a PDCP-U refers to a PDCP user plane, an F1-C refers to an F1 control plane interface, and an F1-U refers to an F1 user plane interface. For example, a network device includes a CU and two DUs. FIG. 4 is a schematic diagram of a structure of another network device according to an embodiment of this application.

Optionally, the terminal device 40 in embodiments of this application may be a device, such as a terminal or a chip that can be used in the terminal, configured to implement a wireless communication function. The terminal may be user equipment (UE), an access terminal, a terminal unit, a terminal station, a mobile station, a remote station, a remote terminal, a mobile device, a wireless communication device, a terminal agent, a terminal apparatus, or the like in the 5G network or the future evolved PLMN. The access terminal may be a cellular phone, a cordless phone, a session initiation protocol (SIP) phone, a wireless local loop (WLL) station, a personal digital assistant (PDA), a handheld device or a computing device having a wireless communication function, another processing device, vehicle-mounted device, or wearable device connected to a wireless modem, a virtual reality (VR) terminal device, an augmented reality (AR) terminal device, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, or the like. The terminal may be mobile or at a fixed location.

Optionally, the first network device 30a, the second network device 30b, and the terminal device 40 in embodiments of this application may also be referred to as a communication apparatus, and may be a general-purpose device or a dedicated device. This is not specifically limited in embodiments of this application.

Figure 5:
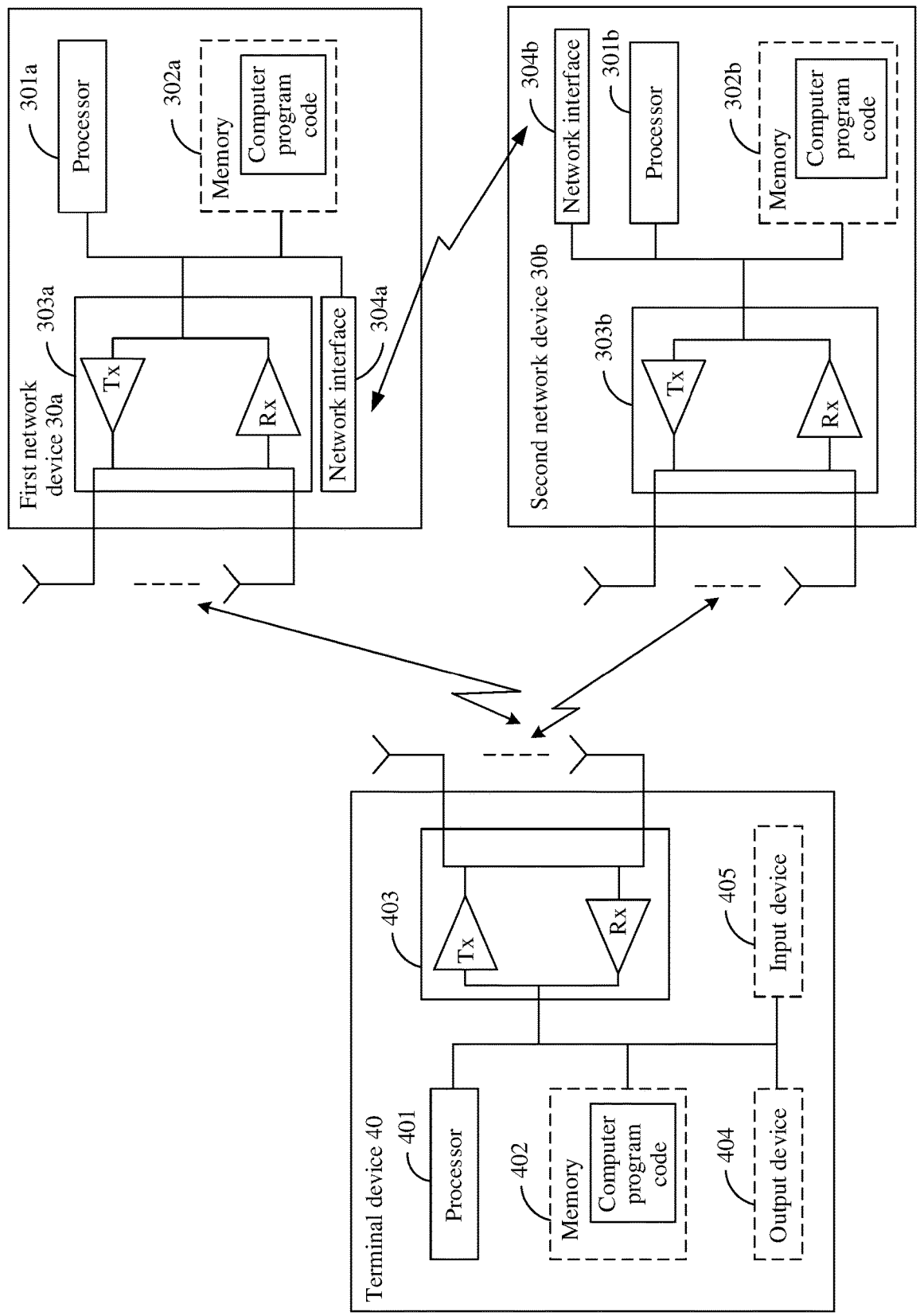
FIG. 5 is a schematic diagram of structures of a terminal device, a first network device, and a second network device according to an embodiment of this application.

Optionally, FIG. 5 is a schematic diagram of structures of a first network device 30a, a second network device 30b, and a terminal device according to an embodiment of this application.

The terminal device includes at least one processor (where an example in which the terminal device includes one processor 401 is used for description in FIG. 5) and at least one transceiver (where an example in which the terminal device includes one transceiver 403 is used for description in FIG. 5). Optionally, the terminal device may further include at least one memory (where an example in which the terminal device includes one memory 402 is used for description in FIG. 5), at least one output device (where an example in which the terminal device includes one output device 404 is used for description in FIG. 5), and at least one input device (where an example in which the terminal device includes one input device 405 is used for description in FIG. 5).

The processor 401, the memory 402, and the transceiver 403 are connected to each other through a communication line. The communication line may include a path for transmitting information between the foregoing components.

The processor 401 may be a general-purpose central processing unit (CPU), a microprocessor, an application-specific integrated circuit (ASIC), or one or more integrated circuits configured to control program execution of the solutions in this application. During specific implementation, in an embodiment, the processor 401 may alternatively include a plurality of CPUs, and the processor 401 may be a single-core (single-CPU) processor or a multi-core (multi-CPU) processor. The processor herein may be one or more devices, circuits, or processing cores configured to process data (for example, computer program instructions).

The memory 402 may be an apparatus having a storage function. For example, the memory 402 may be a read-only memory (ROM), another type of static storage device that can store static information and instructions, a random access memory (RAM), another type of dynamic storage device that can store information and instructions, or may be an electrically erasable programmable read-only memory (EEPROM), a compact disc read-only memory (CD-ROM), another compact disc storage, an optical disc storage (including a compact disc, a laser disc, an optical disc, a digital versatile disc, a Blu-ray disc, and the like), a magnetic disk storage medium, another magnetic storage device, or any other medium that can be used to carry or store expected program code in a form of an instruction or a data structure and that can be accessed by a computer. However, the memory 402 is not limited thereto. The memory 402 may exist independently, and is connected to the processor 401 through the communication line. The memory 402 may alternatively be integrated with the processor 401.

The memory 402 is configured to store computer-executable instructions for performing the solutions in this application, and the processor 401 controls execution of the computer-executable instructions. Specifically, the processor 401 is configured to execute the computer-executable instructions stored in the memory 402, to implement the report transmission method according to embodiments of this application. Optionally, the computer-executable instructions in this embodiment of this application may also be referred to as application program code or computer program code. This is not specifically limited in this embodiment of this application.

The transceiver 403 may be any apparatus of a transceiver type, and is configured to communicate with another device or a communication network such as the Ethernet, a radio access network (RAN), or a wireless local area network (WLAN). The transceiver 403 includes a transmitter (Tx) and a receiver (receiver, Rx). The transceiver may also be an input/output interface.

The output device 404 communicates with the processor 401, and may display information in a plurality of manners. For example, the output device 404 may be a liquid crystal display (LCD), a light emitting diode (LED) display device, a cathode ray tube (cathode ray tube, CRT) display device, a projector (projector), or the like.

The input device 405 communicates with the processor 401, and may receive an input of a user in a plurality of manners. For example, the input device 405 may be a mouse, a keyboard, a touchscreen device, or a sensor device. The first network device 30a includes one or more processors (where an example in which the first network device 30a includes one processor 301a is used for description in FIG. 5), at least one transceiver (where an example in which the first network device 30a includes one transceiver 303a is used for description in FIG. 5), and at least one network interface (where an example in which the first network device 30a includes one network interface 304a is used for description in FIG. 5).

Optionally, the first network device 30a may further include at least one memory (where an example in which the first network device 30a includes one memory 302a is used for description in FIG. 5). The processor 301a, the memory 302a, the transceiver 303a, and the network interface 304a are connected through a communication line. The network interface 304a is configured to connect to a core network device through a link (such as an S1 interface) (where the connection is not shown in FIG. 5), or connect to a network interface of another network device through a wired or wireless link (such as an X2 interface). This is not specifically limited in this embodiment of this application. In addition, for related descriptions of the processor 301a, the memory 302a, and the transceiver 303a, refer to the descriptions of the processor 401, the memory 402, and the transceiver 403 in the terminal device, and details are not repeated herein.

The second network device 30b includes one or more processors (where an example in which the second network device 30b includes one processor 301b is used for description in FIG. 5), at least one transceiver (where an example in which the second network device 30b includes one transceiver 303b is used for description in FIG. 5), and at least one network interface (where an example in which the second network device 30b includes one network interface 304b is used for description in FIG. 5). Optionally, the second network device 30b may further include at least one memory (where an example in which the second network device 30b includes one memory 302b is used for description in FIG. 5). The processor 301b, the memory 302b, the transceiver 303b, and the network interface 304b are connected through a communication line. The network interface 304b is configured to connect to a core network device through a link (such as an S1 interface) (where the connection is not shown in FIG. 5), or connect to a network interface of another network device through a wired or wireless link (such as an X2 interface). This is not specifically limited in this embodiment of this application. In addition, for related descriptions of the processor 301b, the memory 302b, and the transceiver 303b, refer to the descriptions of the processor 401, the memory 402, and the transceiver 403 in the terminal device, and details are not repeated herein.

Figure 6:
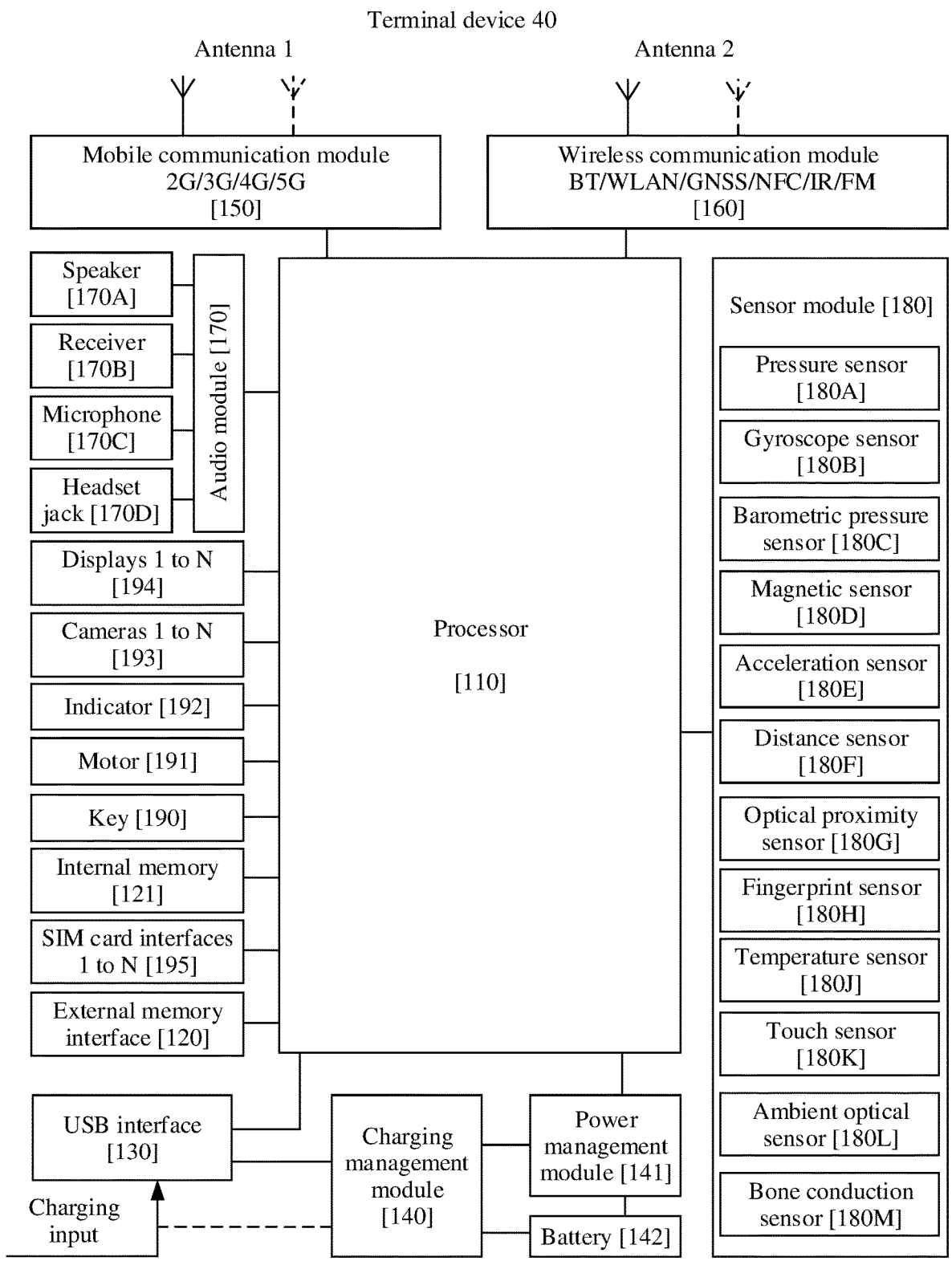
FIG. 6 is a schematic diagram of a structure of another terminal device according to an embodiment of this application.

With reference to the schematic diagram of the structure of the terminal device 40 shown in FIG. 5, for example, FIG. 6 shows a specific form of a structure of a terminal device 40 according to an embodiment of this application.

In some embodiments, a function of the processor 401 in FIG. 5 may be implemented by a processor 110 in FIG. 6.

In some embodiments, a function of the transceiver 403 in FIG. 5 may be implemented by an antenna 1, an antenna 2, a mobile communication module 150, a wireless communication module 160, and the like in FIG. 6.

The antenna 1 and the antenna 2 are configured to transmit and receive electromagnetic wave signals. Each antenna in the terminal device 40 may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 150 may provide a solution used for wireless communication including 2G, 3G, 4G, 5G, and the like on the terminal device 40. The mobile communication module 150 may include at least one filter, a switch, a power amplifier, a low noise amplifier (LNA), and the like. The mobile communication module 150 may receive an electromagnetic wave through the antenna 1, perform processing such as filtering or amplification on the received electromagnetic wave, and transmit the electromagnetic wave to a modem processor for demodulation. The mobile communication module 150 may further amplify a signal modulated by the modem processor, and convert the signal into an electromagnetic wave for radiation through the antenna 1. In some embodiments, at least some functional modules in the mobile communication module 150 may be disposed in the processor 110. In some embodiments, at least some functional modules in the mobile communication module 150 may be disposed in a same device as at least some modules in the processor 110.

The wireless communication module 160 may provide a solution used for wireless communication including a wireless local area network (WLAN) (for example, a Wi-Fi network), Bluetooth® (BT) a global navigation satellite system (GNSS), frequency modulation (FM), near field communication (NFC), an infrared (IR) technology, and the like on the terminal device 40. The wireless communication module 160 may be one or more components integrating at least one communication processing module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2. When the terminal device 40 is a first device, that the wireless communication module 160 may provide a solution used for NFC wireless communication on the terminal device 40 means that the first device includes an NFC chip. The NFC chip may improve an NFC wireless communication function. When the terminal device 40 is a second device, that the wireless communication module 160 may provide a solution used for NFC wireless communication on the terminal device 40 means that the second device includes an electronic label (for example, a radio frequency identification (RFID) label). When approaching the electronic label, an NFC chip of another device may perform NFC wireless communication with the second device.

In some embodiments, the antenna 1 of the terminal device 40 is coupled to the mobile communication module 150, and the antenna 2 is coupled to the wireless communication module 160, so that the terminal device 40 can communicate with a network and another device by using a wireless communication technology. The wireless communication technology may include a global system for mobile communications (GSM), a general packet radio service (GPRS), code division multiple access (CDMA), wideband code division multiple access (WCDMA), time-division code division multiple access (TD-SCDMA), LTE, BT, a GNSS, a WLAN, NFC, FM, an IR technology, and/or the like. The GNSS may include a global positioning system (GPS), a global navigation satellite system (GLONASS), a beidou navigation satellite system (BDS), a quasi-zenith satellite system (QZSS), a satellite based augmentation system (SBAS), or another positioning system.

In some embodiments, a function of the memory 402 in FIG. 5 may be implemented by an internal memory 121, an external memory (such as a Micro SD card) connected through an external memory interface 120 in FIG. 6, or the like.

In some embodiments, a function of the output device 404 in FIG. 5 may be implemented by a display 194 in FIG. 6. The display 194 is configured to display an image, a video, and the like. The display 194 includes a display panel.

In some embodiments, a function of the input device 405 in FIG. 5 may be implemented by a mouse, a keyboard, a touchscreen device, or a sensor module 180 in FIG. 6. For example, as shown in FIG. 6, the sensor module 180 may include, for example, one or more of a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient optical sensor 180L, and a bone conduction sensor 180M. This is not specifically limited in this embodiment of this application.

In some embodiments, as shown in FIG. 6, the terminal device 40 may further include one or more of an audio module 170, a camera 193, an indicator 192, a motor 191, a key 190, a SIM card interface 195, a USB interface 130, a charging management module 140, a power management module 141, and a battery 142. The audio module 170 may be connected to a speaker 170A (which is also referred to as a "horn"), a receiver 170B (which is also referred to as an "earpiece"), a microphone 170C (which is also referred to as a "mike" or a "mic"), a headset jack 170D, or the like. This is not specifically limited in this embodiment of this application.

It may be understood that the structure shown in FIG. 6 does not constitute a specific limitation on the terminal device 40. For example, in some other embodiments of this application, the terminal device 40 may include more or fewer components than those shown in the figure, or some components may be combined, some components may be split, or the components may be differently arranged. The components shown in the figure may be implemented by hardware, software, or a combination of software and hardware.

With reference to the accompanying drawings, the following describes in detail the report transmission method provided in embodiments of this application by using interaction between the first network device 30a, the second network device 30b, and the terminal device 40 shown in FIG. 2 as an example.

It may be understood that in embodiments of this application, the terminal device and/or the network device may perform all or a part of the steps in embodiments of this application. These steps or operations are merely examples.

In embodiments of this application, other operations or variations of various operations may be further performed. In addition, the steps may be performed in a sequence different from a sequence presented in embodiments of this application, and not all operations in embodiments of this application need to be performed.

It may be understood that, in embodiments of this application, interaction between the network device and the terminal device is also applicable to interaction between the CU and the terminal device or interaction between the DU and the terminal device. It may be understood that, in embodiments of this application, a mechanism of the interaction between the network device and the terminal device may be appropriately transformed, to be applicable to the interaction between the CU or the DU and the terminal device.

It should be noted that names of messages between network elements, names of parameters in the messages, or the like in the following embodiments of this application are merely examples, and there may be other names during specific implementation. This is not specifically limited in embodiments of this application.

To describe the technical solutions in embodiments of this application more clearly, the following briefly describes various reports in embodiments of this application.

1. An advance measurement report is a report obtained through advance measurement, and is for quickly configuring dual connectivity or carrier aggregation for a terminal that enters RRC connected mode, where an information element name of the advance measurement report in a protocol may be IdleModeMeasurement. During the advance measurement, when the terminal enters RRC non-connected mode, a network configures a measurement parameter for the terminal device. For example, the measurement parameter is carried in an RRC release message. If the network does not send a related measurement parameter to the terminal device, the terminal device may alternatively read a related measurement parameter from a system message of a serving cell. When the terminal device is in RRC non-connected mode, the terminal device may perform advance measurement based on the measurement parameter obtained by the terminal device, and log an advance measurement report. Then, the terminal device sends the advance measurement report to the network when the terminal device switches to RRC connected mode.

Optionally, in embodiments of this application, a measured object (for example, a target cell) configured by the network may be used as a granularity for the advance measurement report. In other words, related information obtained by the terminal device by measuring the measured object may be used as the advance measurement report.

2. A logged MDT report is a report obtained through logged MDT measurement, and may be used for network coverage optimization and the like, where an information element name of the logged MDT report in a protocol may be LogMeasReport. During the logged MDT, when a terminal device is in RRC connected mode, a network device configures a logged MDT-related configuration for the terminal device, for example, includes the logged MDT-related configuration in an RRC message. After the terminal device enters RRC non-connected mode, the terminal device performs logged MDT measurement based on the logged MDT-related configuration, and logs a report. Then, when the terminal device initiates an RRC connection to the network device, the terminal device includes indication information in an RRC message, to indicate that the terminal device logs the logged MDT report. After receiving the indication information, the network device may request the terminal device to send the report, and the terminal device may send the logged MDT report to the network device based on the request from the network device.

Optionally, the logged MDT-related configuration delivered by the network device may include one or more of the following: time information (absoluteTimeInfo), indicating an absolute time point at which the network device delivers the configuration; an area configuration (areaConfiguration), indicating a valid area of the configuration; a public land network list (plmn-IdentityList), indicating a cell on which logged MDT measurement needs to be performed, where in other words, the logged MDT measurement is performed on a cell whose PLMN ID in a system message is included in the public land network list; a Bluetooth/wireless network name list (bt/wlanNameList), indicating Bluetooth or a wireless network on which logged MDT measurement needs to be performed; and a sensor name list configuration (sensorNameListConfigure), indicating a sensor on which logged MDT needs to be performed.

Optionally, the configuration may further include measurement duration or a measurement interval (LoggingDuration/LoggingInterval), which is for periodically performing logged MDT measurement; or include a measurement trigger condition (LoggingEventTriggerConfig), which is for performing logged MDT measurement based on an event.

In embodiments of this application, the logged MDT report may include one or more of the following: a relative timestamp (relativeTimeStamp), a cell global identifier (cell global identifier, CGI) of a serving cell of the terminal device, a serving cell measurement result, a neighboring cell measurement result, a Bluetooth/wireless network/sensor measurement result, or location information of the terminal device when an event for triggering logged MDT measurement occurs. The relative timestamp indicates a time interval between a time point at which the report is logged and an absolute time point at which the network device delivers the logged MDT configuration.

Optionally, a cell measurement result may include one or more of the following: a physical cell identifier (PCI) of a cell, RSRP/RSRQ of the cell, an identifier of a best-quality beam in the cell, RSRP/RSRQ of the best-quality beam, or a quantity of better-quality beams in the cell.

Optionally, in embodiments of this application, during logged MDT measurement that is periodically performed, a logged MDT report may be at a granularity of a periodicity, in other words, a logged MDT report logged in a periodicity may be used as the logged MDT report. Alternatively, during logged MDT measurement that is performed based on an event, a logged MDT report may be at a granularity of an event, in other words, a logged MDT report logged after a trigger event occurs may be used as the logged MDT report. Alternatively, logged MDT may be at a granularity of a serving cell, Bluetooth, a wireless network, or a sensor, in other words, related information obtained by the terminal device by measuring the serving cell, Bluetooth, the wireless network, or the sensor may be used as a logged MDT report. Alternatively, a logged MDT report logged in a mode switching process of the terminal device from RRC non-connected mode to RRC connected mode may be used as an MDT report.

3. An accessibility failure report includes an RRC establishment failure report and/or an RRC resume failure report, where an information element name of the accessibility failure report in a protocol may be ConnEstFailReport, where "Conn" means connection, and "Est" means establishment.

In embodiments of this application, the accessibility failure report may include one or more of the following: information about a failed cell, a neighboring cell measurement result, a quantity of preamble (Preamble) attempts, whether transmit power of a terminal device reaches a transmit power upper limit, time since failure (TimeSinceFailure) information, or location information of the terminal device when an RRC establishment failure or an RRC resume failure occurs. The time since failure information indicates a time interval between a moment at which the RRC establishment failure or an RRC resume failure occurs and a moment at which the accessibility failure report is sent.

Optionally, in embodiments of this application, the accessibility failure report may be at a granularity of a failed cell, and an accessibility failure report related to a failed cell may be used as the accessibility failure report.

4. A random access report is for logging an entire process of one time of random access (which refers to successful random access), where an information element name of the random access report in a protocol may be ra-Report.

In embodiments of this application, the random access report may include one or more of the following: identification information of an access cell, a time-frequency resource for access, a quantity of preamble attempts, or the like.

Optionally, in embodiments of this application, the random access report may be at a granularity of an accessed cell, and a random access report related to an accessed cell may be used as the random access report.

5. A radio link failure report includes a radio link failure (RLF) report and/or a handover failure (HOF) report, where an information element name of the radio link failure report in a protocol may be rlf-Report.

In embodiments of this application, the radio link failure report may include one or more of the following: information about a failed cell in which a failure occurs, signal quality of the failed cell, information about a reestablishment cell, a time point at which the failure occurs, or the like.

Optionally, in embodiments of this application, the radio link failure report may be at a granularity of a failed cell in which a failure occurs, and a radio link failure report related to a failed cell may be used as the radio link failure report.

6. A mobility history report includes information about a cell on which a terminal device has camped, where an information element name of the mobility history report in a protocol may be mobilityHistoryReport.

Optionally, the cell on which the terminal device has camped may be a cell in which the terminal device has monitored a system message. The information about the camped cell may include, for example, an identifier of the cell, and relative timestamp information about camping on the cell.

Optionally, in embodiments of this application, information about all cells on which the terminal device has camped may be used as a mobility history report. Alternatively, it may be considered that a mobility history report includes information about a specific quantity of cells.

It should be noted that, for the advance measurement report, the terminal device performs advance measurement based on a configuration parameter that is delivered by the network device and that is used for the advance measurement, to log the advance measurement report. For the logged MDT measurement, the terminal device performs logged MDT measurement based on a configuration parameter that is delivered by the network device and that is used for the logged MDT measurement, to obtain the logged MDT measurement report. For the foregoing other reports, the terminal device may not perform measurement based on a configuration parameter from the network device. When a type of event occurs, the terminal device may log a report of the type. For example, when the RLF occurs, the terminal device may log the radio link failure report.

It may be understood that, for the advance measurement and the logged MDT measurement, when serving cells of the terminal device are different, configuration parameters that are delivered by network devices to which the serving cells belong and that are used for measurement may be different. For example, if a serving cell of the terminal device at moment 1 is cell 1, and a serving cell of the terminal device at moment 2 is cell 2, a configuration parameter that is used for logged MDT measurement and that is delivered by a network device to which cell 1 belongs may be different from a configuration parameter that is used for logged MDT measurement and that is delivered by a network device to which cell 2 belongs.

Figure 7:
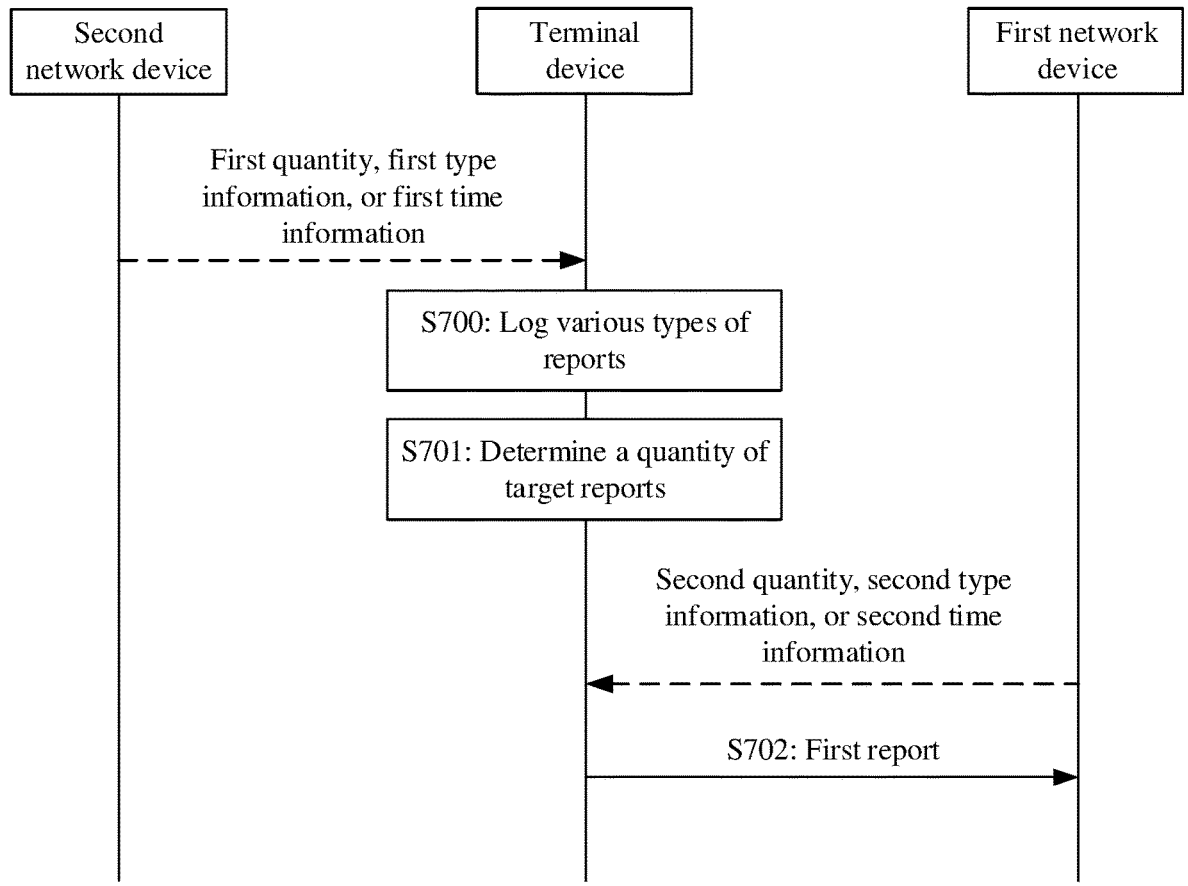
FIG. 7 is a schematic flowchart of a report transmission method according to an embodiment of this application.

FIG. 7 shows a report transmission method according to an embodiment of this application. The report transmission method includes the following steps S700 to S702.

In this embodiment of this application, it is assumed that when a terminal device camps on a second network device, the terminal device logs various types of reports, that is, performs the following step S700; and when the terminal device prepares to access a first network device, the terminal device performs the following step S701.

It may be understood that the first network device and the second network device may be different or may be the same. When the first network device and the second network device are the same, in this embodiment of this application, it is assumed that the terminal device performs the following step S700 when camping on the first network device (or the second network device) last time, and the terminal device performs the following step S701 when preparing to access the first network device (or the second network device) next time. This application is described by using an example in which the first network device and the second network device are different.

S700: The terminal device logs the various types of reports.

The report logged by the terminal device may include one or more of the six types of reports described in the foregoing embodiments.

Optionally, in this embodiment of this application, a radio link failure-like report is further provided, where the radio link failure-like report is for logging a first event and/or a second event. The first event means that a quantity of data retransmissions of the terminal device is greater than or equal to a first preset quantity of times and is less than a second preset quantity of times. The second event means that the terminal device performs handover, and duration from a moment at which the terminal device receives a handover command to a moment at which the terminal device successfully accesses a target cell is greater than or equal to first preset duration and is less than second preset duration. That is, the terminal device may further log the foregoing radio link failure-like report.

It may be understood that the radio link failure-like report may alternatively have another name. This is not specifically limited in this embodiment of this application.

The following describes the radio link failure-like report by using an example in which the radio link failure-like report logged by the terminal device includes a second report and/or a third report.

It should be noted that, in this embodiment of this application, a first report is further provided. The first report is described in detail in a subsequent embodiment, and details are not described herein.

For the second report:

The second report includes a first value N, the first value is a quantity of times that the first event occurs in a third time period, and the first event means that the quantity of data retransmissions of the terminal device is greater than or equal to the first preset quantity of times and is less than the second preset quantity of times.

It should be noted that, in this embodiment of this application, a first time period and a second time period are further provided. The first time period and the second time period are described in detail in a subsequent embodiment, and details are not described herein.

Optionally, the third time period may be indicated by the second network device to the terminal device. For example, the second network device may indicate duration of the third time period to the terminal device, where the terminal device may determine that a start moment of the third time period is a moment at which an indication is received, and the duration of the third time period is duration indicated by the second network device. Alternatively, the second network device may indicate a start moment and duration of the third time period to the terminal device. Alternatively, the second network device may indicate a start moment and an end moment of the third time period to the terminal device.

Optionally, the first preset quantity of times may be indicated by the second network device to the terminal device, or may be specified in a protocol, or may be determined by the terminal device. This is not specifically limited in this embodiment of this application.

Optionally, the second preset quantity of times may be a quantity of times of determining an RLF, where the quantity of times is specified in the existing TS 38.331 protocol, and the quantity of times may be a maximum quantity of uplink RLC retransmissions, or may be a maximum quantity of MAC layer scheduling request indicator (SRI) retransmissions. For example, if the second preset quantity of times specified in the existing protocol is 10, when the quantity of data retransmissions of the terminal device is greater than or equal to 10, it is determined that the RLF occurs on the terminal device.

For example, the third time period is from 9:00 to 10:00, the first preset quantity of times is 7, and the second preset quantity of times is 10. The second report may log a quantity of times of an event in which the quantity of data retransmissions of the terminal device is greater than or equal to 7 and less than or equal to 10 from 9:00 to 10:00. For example, a quantity of retransmissions of data 1 of the terminal device is 8 from 9:00 to 10:00. The first seven retransmissions fail, and the eighth retransmission succeeds. In this case, the first value is 1. If the terminal device further retransmits data 2 from 9:00 to 10:00, and a quantity of retransmissions of data 2 is 9, where the first eight retransmissions fail, and the ninth retransmission succeeds, the first value changes to 2. That is, the first event occurs twice from 9:00 to 10:00.

Optionally, the second report further includes N second values, and an $i^{th}$ second value is a quantity of data retransmissions of the terminal device in an $i^{th}$ first event that occurs in the third time period, where i is a positive integer from 1 to N. For example, based on the foregoing example, the second report includes two second values, where a first second value is 8, and a second value is 9.

In other words, the second report may log, in a period of time, a case in which a quantity of data retransmissions is large but no RLF occurs, and may reflect a case of continuous poorness of signal quality, so that a network device performs optimization for this case, to improve network performance and user experience. Optionally, in this embodiment of this application, the second report may use the third time period as a granularity, that is, one third time period corresponds to one second report.

For the third report:

The third report includes a third value M, the third value is a quantity of times that the second event occurs in a fourth time period, and the second event means that the terminal device performs handover, and the duration from the moment at which the terminal device receives the handover command to the moment at which the terminal device successfully accesses the target cell is greater than or equal to the first preset duration and is less than the second preset duration.

Optionally, the fourth time period and the third time period may be the same or may be different. The fourth time period may be indicated by the second network device to the terminal device. For an indication method, refer to related descriptions of indicating the third time period by the second network device to the terminal device. Details are not described herein.

Optionally, the first preset duration may be indicated by the second network device to the terminal device, or may be specified in a protocol, or may be determined by the terminal device. This is not specifically limited in this embodiment of this application.

Optionally, the second preset duration may be duration of a timer T304 specified in the existing protocol TS 38.331. T304 is for determining whether an HOF occurs. A start condition of T304 is that the terminal device receives an RRC reconfiguration message carrying a handover command, and an end condition is that the terminal device completes random access (in other words, is successfully handed over) to the target cell. If T304 expires, and the terminal device still does not complete random access to the target cell, it is determined that the handover fails, in other words, the HOF occurs.

For example, the fourth time period is from 9:00 to 10:00, the first preset duration is 50 milliseconds, and the second preset duration is 100 milliseconds. The third report may log, when the terminal device performs handover from 9:00 to 10:00, a quantity of times that the duration from the moment at which the terminal device receives the handover command to the moment at which the terminal device successfully accesses the target cell is greater than or equal to 50 milliseconds and is less than 100 milliseconds in a process of the handover. For example, the terminal device performs handover for three times from 9:00 to 10:00, where first duration in first handover is 52 milliseconds, first duration in second handover is 63 milliseconds, and first duration in third handover is 40 milliseconds. In this case, the third value is 2 (which refers to the first two times of handover), in other words, the second event occurs twice from 9:00 to 10:00. The first duration is the duration from the moment at which the terminal device receives the handover command to the moment at which the terminal device successfully accesses the target cell.

Optionally, the third report may further include information indicating the fourth time period, and/or M first duration, where $j^{th}$ first duration is duration, in a $j^{th}$ second event that occurs in the fourth time period, from a moment at which the terminal device receives a handover command to a moment at which the terminal device successfully accesses a target cell, and j is a positive integer from 1 to M. For example, based on the foregoing example, the third report may include two pieces of first duration, where a first piece of first duration is 52 milliseconds, and a second piece of first duration is 63 milliseconds.

In other words, the third report may log, in a period of time, a case in which handover takes a long time period but no HOF occurs, and may reflect a case in which a target cell is not properly selected or network coverage quality of a target cell is poor, so that the network device performs optimization for this case, to improve network performance and user experience.

Optionally, in this embodiment of this application, the third report may use the fourth time period as a granularity, that is, one fourth time period corresponds to one third report.

Optionally, after logging the second report or the third report, the terminal device may use the second report or the third report as a target report, and continue to perform subsequent steps of the report transmission method provided in this embodiment of this application, that is, send the second report or the third report by using the report transmission method provided in this embodiment of this application. Alternatively, the terminal device may send the second report or the third report without using the method provided in this embodiment of this application. This is not specifically limited in this embodiment of this application. In other words, a method for logging the second report or the third report provided in this embodiment of this application may be independently performed, and the method does not depend on the report transmission method provided in this application.

Optionally, a report logged by the terminal device in step S700 may further include another type of report, for example, may include a related report for mobility management, where the mobility management may include, for example, cell handover, cell selection, or cell reselection.

S701: The terminal device determines a quantity of target reports.

To be specific, the terminal device determines the quantity of target reports based on a plurality of reports logged in step S700.

Optionally, a type of the target report is a first type, and the first type includes one or more of the following: an advance measurement report, a logged MDT report, an accessibility failure report, a random access report, a radio link failure report, a mobility history report, and a radio link failure-like report.

For example, it is assumed that the advance measurement report, the logged MDT report, and the mobility history report are logged in step S700, and the first type is the logged MDT report. In this case, the target report is the logged MDT report, and the quantity of target reports is a quantity of logged MDT reports.

Optionally, the first type may be determined by the terminal device, or may be indicated by the second network device to the terminal device. In this scenario, the report transmission method provided in this embodiment of this application further includes: The second network device sends first type information to the terminal device, where the first type information indicates the first type. Accordingly, the terminal device receives the first type information from the second network device.

Further, optionally, the target report may be logged by the terminal device in the first time period. For example, based on the foregoing example, it is assumed that the terminal device logs the logged MDT report from 9:00 to 11:00, and the first time period is from 9:00 to 10:00. In this case, the quantity of target reports is a quantity of logged MDT reports logged by the terminal device from 9:00 to 10:00.

Optionally, the first time period may be determined by the terminal device, or may be indicated by the second network device to the terminal device. In this scenario, the report transmission method provided in this embodiment of this application further includes: The second network device sends first time information to the terminal device, where the first time information indicates the first time period. Accordingly, the terminal device receives the first time information from the second network device. For a method in which the first time information indicates the first time period, refer to a method in which the second network device indicates the third time period to the terminal device. Details are not described herein.

After determining the quantity of target reports, the terminal device compares the quantity of target reports with a first quantity, and performs the following step S702 when the quantity of target reports is greater than or equal to the first quantity.

Optionally, the first quantity may be determined by the terminal device, or may be specified in a protocol, or may be indicated by the second network device to the terminal device. In this scenario, the report transmission method provided in this embodiment of this application further includes: The second network device obtains the first quantity and sends the first quantity to the terminal device. Accordingly, the terminal device receives the first quantity from the second network device, where the first quantity is used to configure the terminal device to send the first report when the quantity of target reports is greater than or equal to the first quantity.

Optionally, any one of the first quantity, the first time period, or the first type may be indicated by the second network device to the terminal device by using a system message, a multicast message, or a broadcast message. For example, the second network device indicates the first quantity to the terminal device by using a system message, and indicates the first time period and the first type to the terminal device by using a dedicated RRC message. This is not specifically limited in this embodiment of this application.

Optionally, if the second network device indicates one or more parameters of the first quantity, the first time period, and the first type in both the system message and the dedicated RRC message, the terminal device uses the parameter indicated in the dedicated RRC message. For example, if a first quantity indicated in the system message is 10, and a first quantity indicated in the dedicated RRC message is 12, the terminal device determines that the first quantity is 12.

S702: The terminal device sends the first report to the first network device. Accordingly, the first network device receives the first report from the terminal device.

The first report includes one or more target reports.

Optionally, a quantity of target reports included in the first report may be a second quantity, to be specific, the second quantity is the quantity of target reports included in the first report reported by the terminal device. It may be understood that the second quantity is less than or equal to the quantity of target reports determined by the terminal device in step S701.

Optionally, the second quantity is a quantity of target reports logged by the terminal device in the second time period. It may be understood that the second time period is included in the first time period or is the same as the first time period. Alternatively, the second quantity is a quantity of target reports of a second type. It may be understood that the second type is the same as the first type, or the second type includes a part of types included in the first type. For example, when the first type includes the advance measurement report and the logged MDT report, the second type may be the logged MDT report. Alternatively, the second quantity is a quantity of target reports of a second type that are logged by the terminal device in the second time period. For example, it is assumed that the first time period is from 9:00 to 10:00, the second time period is from 9:00 to 9:30, the first type includes the advance measurement report and the logged MDT report, the second type is the logged MDT report, and the second quantity is a quantity of logged MDT reports logged by the terminal device from 9:00 to 9:30. Optionally, the second quantity may be determined by the terminal device, or may be indicated by the first network device. In this scenario, before step S702, the report transmission method provided in this embodiment of this application may further include: The first network device sends first information to the terminal device, where the first information is for determining the first report, and the quantity of target reports included in the first report is the second quantity. Accordingly, the terminal device receives the first information from the first network device.

Optionally, the first information may include the second quantity, in other words, the first network device explicitly indicates the second quantity to the terminal device. In this case, the first report includes a second quantity of target reports. Alternatively, the first information may include second time information, and the second time information indicates the second time period. In this scenario, the terminal device may determine, based on the second time information, that the first report is the target report logged by the terminal device in the second time period, and the second quantity is the quantity of target reports logged by the terminal device in the second time period. Alternatively, the first information may include second type information, and the second type information indicates the second type. In this scenario, the terminal device may determine, based on the second type information, that the first report is the target report of the second type logged by the terminal device, where the second quantity is the quantity of target reports of the second type. Alternatively, the first information may include second time information and second type information. In this scenario, the terminal device may determine, based on the first information, that the first report is the target report of the second type logged by the terminal device in the second time period, and the second quantity is the quantity of target reports of the second type logged by the terminal device in the second time period.

Optionally, when the second quantity is indicated by the first network device, before the first network device indicates the second quantity to the terminal device, the report transmission method provided in this embodiment of this application may further include: The terminal device sends an indication message to the first network device, where the indication message indicates one or more of the following: a type of the target report logged by the terminal device, a quantity of target reports of various types, or a time period (for example, the first time period) in which the terminal device logs the target report. Accordingly, after receiving the indication message from the terminal device, the first network device may indicate the second quantity to the terminal device based on the indication message, that is, the first network device sends the first information to the terminal device based on the indication message.

Based on this solution, the first network device can indicate, to the terminal device, a report required by the first network device, to prevent the terminal device from sending another report that is not required by the first network device, so that a resource waste is reduced and resource utilization is improved.

Optionally, the terminal device may send the first report to the first network device by using one of an RRC setup complete message, an RRC reconfiguration complete (RRC Reconfiguration Complete) message, an RRC reestablishment complete (RRC Reestablishment Complete) message, a user equipment information response (UE information response) message, or an RRC resume complete message. Alternatively, the terminal device may send the first report to the network device by using one of message 1 (msg1), message 3 (msg3), message 5 (msg5), or message A (msgA) in a random access process.

Optionally, after sending the first report to the first network device, the terminal device may delete the first report logged by the terminal device.

Optionally, when the first network device includes a CU and a DU, the CU may receive the first report from the terminal device, and then the CU may send the first report to the DU through an F1 interface. When the CU includes a CU-CP and a CU-UP, the CU-CP may receive the first report from the terminal device, and then may send the first report to the CU-UP through an E1 interface.

After receiving the first report, the first network device may process the first report. Optionally, the processing the first report may include performing network coverage optimization based on the first report. For example, when the first report includes cell information, transmit power of a related cell included in the first report may be improved, to improve coverage. Alternatively, an operator may increase, based on location information of the terminal device included in the first report, network devices deployed in an area indicated by the location information, or the like.

Optionally, when the first report includes the accessibility failure report, a network device may adjust a random access resource configuration based on the accessibility failure report, to improve an access success rate.

Based on this solution, a mechanism of sending a report based on a condition can be implemented. When the quantity of target reports logged by the terminal device is greater than or equal to the first quantity, the terminal device sends the first report to the first network device. This can prevent the terminal device from frequently sending the target report, to reduce power consumption of the terminal device. In addition, because the terminal device can be prevented from frequently sending the target report, resource occupation can be reduced, so that the terminal device transmits a data service by using more resources after accessing the network device, to improve resource utilization.

Optionally, the terminal device may send the first report to the first network device under different conditions.

In a possible implementation, the terminal device may send the first report to the first network device based on an indication from the first network device. For example, when the terminal device initiates access to the first network device, the first network device may send a report sending indication to the terminal. For example, the network device may broadcast the indication. After the terminal device enters RRC connected mode, the terminal device sends the first report to the first network device.

In another possible implementation, the terminal device may send the first report to the first network device based on a request from the first network device. In this scenario, before step S702, the method further includes: The first network device sends request information to the terminal device. Accordingly, the terminal device receives the request information from the first network device. The request information is for requesting the terminal device to send the first report. In this implementation, that the terminal device sends the first report to the first network device may include: The terminal device sends the first report to the first network device based on the request information.

Optionally, that the first network device sends request information to the terminal device may include: The first network device sends the request information to the terminal device based on indication information. In this implementation, before step S702, the method according to this embodiment of this application further includes: The terminal device sends the indication information to the first network device, where the indication information indicates that the terminal device has the target report and/or the quantity of target reports. Accordingly, the first network device receives the indication information from the terminal device.

Optionally, the indication information may be sent by using the RRC setup complete message or the RRC resume complete message. In the indication information, one bit may be used to indicate whether the terminal device has the target report. For example, when a value of the bit is "1", it indicates that the terminal device has the target report, or when a value of the bit is "0", it indicates that the terminal device has the target report. In the indication information, a field may be used to indicate the quantity of target reports. For example, a value of the field is used to indicate the quantity of target reports.

Optionally, when the indication information indicates the quantity of target reports, that the first network device sends the request information to the terminal device based on indication information includes: When the quantity of target reports is greater than or equal to a first threshold, the first network device sends the request information to the terminal device, where the first threshold may be greater than the first quantity. For example, the first quantity is 10, and the first threshold may be 15. When the quantity of target reports indicated by the indication information is greater than or equal to 15, the first network device sends the request information to the terminal device.

Optionally, in an implementation scenario of this embodiment of this application, after receiving the first report, the first network device may further send the first report to the second network device or another network device (for example, a network device to which a part of cells logged in the first report belong), so that the second network device or the another network device performs network optimization.

For example, the first network device sends the first report to the second network device. The first network device may send the first report to the second network device through an Xn interface or an X2 interface, or may send the first report to a core network device through an NG interface or an S1 interface, and the core network device sends the first report to the second network device.

The foregoing embodiment describes an implementation method in a case in which the quantity of target reports is greater than or equal to the first quantity. Optionally, when the quantity of target reports is less than or equal to the first quantity, the terminal device may not send the first report to the first network device, and after accessing the first network device, the terminal device performs service data transmission with the first network device. In addition, the terminal device may continue to log various types of reports until the terminal device is ready to access a third network device. For example, the terminal device switches to RRC non-connected mode in the first network device, and initiates an RRC connection to the third network device.

Optionally, when the terminal device continues to log the various types of reports after accessing the first network device, the terminal device may or may not delete a report logged by the terminal device before the terminal device accesses the first network device. This is not specifically limited in this embodiment of this application.

Optionally, in a process in which the terminal device continues to log the various types of reports, for a report, for example, an advance measurement report or a logged MDT report, obtained by performing measurement based on a configuration parameter delivered by a network device, when the terminal device camps on the first network device, if the first network device delivers the configuration parameter, the terminal device may perform measurement based on the configuration parameter delivered by the first network device and log the report; or if the first network device does not deliver the configuration parameter, the terminal device may perform measurement based on a configuration parameter delivered by the second network device and log the report.

Optionally, when preparing to access the third network device, the terminal device may determine a quantity of target reports at a current moment. When the quantity of target reports is greater than or equal to the first quantity, the terminal device sends the first report to the third network device. When the quantity of target reports is less than or equal to the first quantity, the terminal device does not send the first report to the third network device, and continues to log the various types of reports.

Optionally, the first quantity in this scenario may be indicated by the first network device to the terminal device, or may be indicated by the second network device to the terminal device.

In other words, each time the terminal device accesses a network device, the terminal device may determine a quantity of target reports. When the quantity of target reports is greater than or equal to the first quantity, the terminal device sends the first report to a currently accessed network device. Alternatively, when the quantity of target reports is less than or equal to the first quantity, the terminal device does not send the first report to a currently accessed network device, and continues to log various reports. Optionally, the first quantity in this scenario may be indicated to the terminal device by one of network devices accessed by the terminal device prior to current access.

It may be understood that the foregoing method may be applied to a scenario in which the terminal device communicates with an NTN network, but shall not constitute any limitation on this application. This application may be further applied to another scenario, for example, may be applied to a scenario in which the terminal device is frequently handed over due to a high moving speed of the terminal device.

In the embodiment shown in FIG. 7, actions of the first network device may be performed by the processor 301a in the first network device 30a shown in FIG. 5 by invoking the application program code stored in the memory 302a, to indicate the first network device to perform the actions. In the embodiment shown in FIG. 7, actions of the second network device may be performed by the processor 301*b* in the second network device 30*b* shown in FIG. 5 by invoking the application program code stored in the memory 302*b*, to indicate the second network device to perform the actions. In the embodiment shown in FIG. 7, actions of the terminal device may be performed by the processor 401 in the terminal device 40 shown in FIG. 5 by invoking the application program code stored in the memory 402, to indicate the terminal device to perform the actions. This is not limited in this embodiment.

In embodiments of this application, unless otherwise stated or there is a logic conflict, terms and/or descriptions between different embodiments are consistent and may be mutually referenced, and technical features in different embodiments may be combined based on an internal logical relationship thereof, to form a new embodiment.

It may be understood that in the foregoing embodiments, the method and/or step implemented by the terminal device may alternatively be implemented by a component (for example, a chip or a circuit) that can be used in the terminal device, the method and/or step implemented by the network device (including the first network device and the second network device) may alternatively be implemented by a component (for example, a chip or a circuit) that can be used in the network device, and the method and/or step implemented by the core network device may alternatively be implemented by a component (for example, a chip or a circuit) that can be used in the core network device.

The foregoing mainly describes the solutions provided in embodiments of this application from a perspective of interaction between network elements. Correspondingly, embodiments of this application further provide a communication apparatus, and the communication apparatus is configured to implement the foregoing various methods. The communication apparatus may be the terminal device in the foregoing method embodiment, or an apparatus including the foregoing terminal device, or a component that can be used in the terminal device. Alternatively, the communication apparatus may be the network device in the foregoing method embodiment, or an apparatus including the foregoing network device, or a component that can be used in the network device. It may be understood that, to implement the foregoing functions, the communication apparatus includes a hardware structure and/or a software module for performing a corresponding function. A person skilled in the art should easily be aware that, in combination with units and algorithm steps of the examples described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the communication apparatus may be divided into functional modules based on the foregoing method embodiment. For example, each functional module may be obtained through division based on each corresponding function, or two or more functions may be integrated into one processing module. The integrated module may be implemented in a form of hardware, or may be implemented in a form of a software functional module. It should be noted that, in embodiments of this application, module division is an example, and is merely a logical function division. During actual implementation, another division manner may be used.

Figure 8:
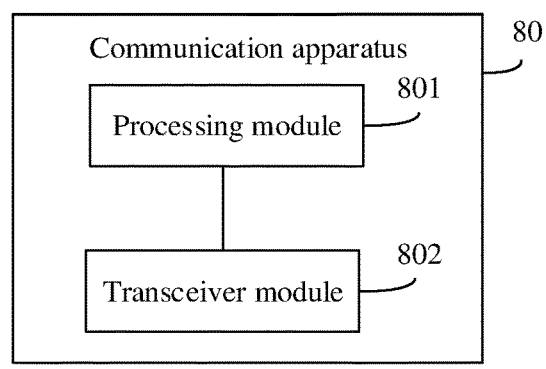
FIG. 8 is a schematic diagram of a structure of a communication apparatus according to an embodiment of this application.

For example, the communication apparatus implements the steps of the terminal device in the foregoing method embodiment. FIG. 8 is a schematic diagram of a structure of a communication apparatus 80. The communication apparatus 80 includes a processing module 801 and a transceiver module 802. The transceiver module 802 may also be referred to as a transceiver unit, and is configured to implement a sending and/or receiving function. For example, the transceiver module may be a transceiver circuit, a transceiver, or a communication interface.

The transceiver module 802 may include a receiving module and a sending module, which are respectively configured to perform receiving and sending steps performed by the terminal device in the foregoing method embodiment. The processing module 801 may be configured to perform steps other than the receiving and sending steps performed by the terminal device in the foregoing method embodiment.

In a possible implementation, the processing module 801 is configured to determine a quantity of target reports; and when the quantity of target reports is greater than or equal to a first quantity, the transceiver module 802 is configured to send a first report to a first network device, where the first report includes one or more target reports.

Optionally, the transceiver module 802 is further configured to receive first time information from a second network device, where the first time information indicates a first time period.

Optionally, the transceiver module 802 is further configured to receive first type information from the second network device, where the first type information indicates a first type.

Optionally, the transceiver module 802 is further configured to receive the first quantity from the second network device.

Optionally, the transceiver module 802 is further configured to send indication information to the first network device, where the indication information indicates that a terminal device has the target report and/or the quantity of target reports.

Optionally, the transceiver module 802 is further configured to receive request information from the first network device, where the request information is for requesting the terminal device to send the first report. That the transceiver module 802 is configured to send the first report to the first network device includes: The transceiver module 802 is configured to send the first report to the first network device based on the request information.

Optionally, the transceiver module 802 is further configured to receive first information from the first network device. The processing module 801 is further configured to determine the first report based on the first information, where a quantity of target reports included in the first report is a second quantity.

Optionally, the processing module 801 is further configured to log a second report, where the second report includes a first value N, the first value is a quantity of times that a first event occurs in a third time period, and the first event means that a quantity of data retransmissions of the terminal device is greater than or equal to a first preset quantity of times and is less than a second preset quantity of times. The processing module 801 is further configured to use the second report as the target report.

Optionally, the processing module 801 is further configured to log a third report, where the third report includes a third quantity of times a third value M, the third value is a quantity of times that a second event occurs in a fourth time period, and the second event means that the terminal device performs handover, and duration from a moment at which the terminal device receives a handover command to a moment at which the terminal device successfully accesses a target cell is greater than or equal to first preset duration and is less than second preset duration. The processing module 801 is further configured to use the third report as the target report.

In another possible implementation, the processing module 801 is configured to log a second report, where the second report includes a first value N, the first value is a quantity of times that a first event occurs in a third time period, and the first event means that a quantity of data retransmissions of the terminal device is greater than or equal to a first preset quantity of times and is less than a second preset quantity of times; and the transceiver module 802 is configured to send the second report.

In still another possible implementation, the processing module 801 is configured to log a third report, where the third report includes a third quantity of times a third value M, the third value is a quantity of times that a second event occurs in a fourth time period, and the second event means that the terminal device performs handover, and duration from a moment at which the terminal device receives a handover command to a moment at which the terminal device successfully accesses a target cell is greater than or equal to first preset duration and is less than second preset duration; and the transceiver module 802 is configured to send the third report.

All related content of the steps in the foregoing method embodiment may be cited in function descriptions of the corresponding functional modules. Details are not described herein again.

Optionally, the communication apparatus 80 may further include a storage module (not shown in FIG. 8), configured to store data and/or instructions. The processing module 801 may read the data or the instructions in the storage module, to implement the method corresponding to the foregoing embodiments.

It may be understood that the foregoing modules may be independently disposed, or may be integrated. This is not limited in this embodiment of this application.

In a possible implementation, the communication apparatus 80 is presented in an integrated form of functional modules obtained through division. The module herein may be an ASIC, a circuit, a processor that executes one or more software or firmware programs, a memory, an integrated logic circuit, and/or another component capable of providing the foregoing functions. In a simple embodiment, a person skilled in the art may figure out that the communication apparatus 80 may be in a form of the terminal device 40 shown in FIG. 5.

For example, the processor 401 in the terminal device 40 shown in FIG. 5 may invoke the computer-executable instructions stored in the memory 402, so that the terminal device 40 performs the report transmission method according to the foregoing method embodiment.

Specifically, the processor 401 in the terminal device 40 shown in FIG. 5 may invoke the computer-executable instructions stored in the memory 402, to implement functions/implementation processes of the processing module 801 and the transceiver module 802 in FIG. 8. Alternatively, the processor 401 in the terminal device 40 shown in FIG. 5 may invoke the computer-executable instructions stored in the memory 402, to implement functions/implementation processes of the processing module 801 in FIG. 8, and the transceiver 403 in the terminal device 40 shown in FIG. 5 may implement functions/implementation processes of the transceiver module 802 in FIG. 8.

Because the communication apparatus 80 provided in this embodiment may perform the foregoing report transmission method, for a technical effect that can be achieved by the communication apparatus 80, refer to the foregoing method embodiment. Details are not described herein.

Figure 9:
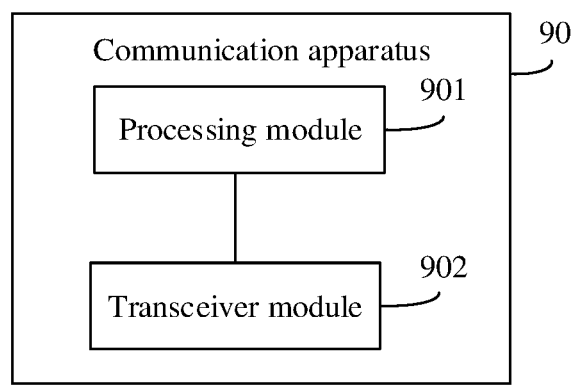
FIG. 9 is a schematic diagram of a structure of another communication apparatus according to an embodiment of this application.

Alternatively, for example, the communication apparatus implements the steps of the second network device in the foregoing method embodiment. FIG. 9 is a schematic diagram of a structure of a communication apparatus 90. The communication apparatus 90 includes a processing module 901 and a transceiver module 902. The transceiver module 902 may also be referred to as a transceiver unit, and is configured to implement a sending and/or receiving function. For example, the transceiver module may be a transceiver circuit, a transceiver, or a communication interface.

The transceiver module 902 may include a receiving module and a sending module, which are respectively configured to perform receiving and sending steps performed by the second network device in the foregoing method embodiment. The processing module 901 may be configured to perform steps other than the receiving and sending steps performed by the second network device in the foregoing method embodiment.

The processing module 901 is configured to obtain a first quantity, where the first quantity is used to configure a terminal device to send a first report when a quantity of target reports is greater than or equal to the first quantity, and the first report includes one or more target reports. The transceiver module 902 is configured to send the first quantity to the terminal device.

Optionally, the transceiver module 902 is further configured to send first time information to the terminal device, where the first time information indicates a first time period.

Optionally, the transceiver module 902 is further configured to send first type information to the terminal device, where the first type information indicates a first type.

All related content of the steps in the foregoing method embodiment may be cited in function descriptions of the corresponding functional modules. Details are not described herein again.

Optionally, the communication apparatus 90 may further include a storage module (not shown in FIG. 9), configured to store data and/or instructions. The processing module 901 may read the data or the instructions in the storage module, to implement the method corresponding to the foregoing embodiments.

It may be understood that the foregoing modules may be independently disposed, or may be integrated. This is not limited in this embodiment of this application.

In a possible implementation, the communication apparatus 90 is presented in an integrated form of functional modules obtained through division. The module herein may be an ASIC, a circuit, a processor that executes one or more software or firmware programs, a memory, an integrated logic circuit, and/or another component capable of providing the foregoing functions. In a simple embodiment, a person skilled in the art may figure out that the communication apparatus 90 may be in a form of the second network device 30b shown in FIG. 5.

For example, the processor 301b in the second network device 30b shown in FIG. 5 may invoke the computer-executable instructions stored in the memory 302b, so that the second network device 30*b* performs the report transmission method according to the foregoing method embodiment.

Specifically, the processor 301*b* in the second network device 30*b* shown in FIG. 5 may invoke the computer-executable instructions stored in the memory 302*b*, to implement functions/implementation processes of the processing module 901 and the transceiver module 902 in FIG. 9. Alternatively, the processor 301*b* in the second network device 30*b* shown in FIG. 5 may invoke the computer-executable instructions stored in the memory 302*b*, to implement functions/implementation processes of the processing module 901 in FIG. 9, and the transceiver 303*b* in the second network device 30*b* shown in FIG. 5 may implement functions/implementation processes of the transceiver module 902 in FIG. 9.

Because the communication apparatus 90 provided in this embodiment may perform the foregoing report transmission method, for a technical effect that can be achieved by the communication apparatus 90, refer to the foregoing method embodiment. Details are not described herein.

Figure 10:
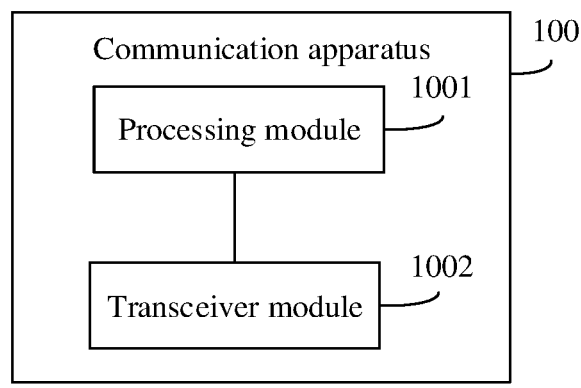
FIG. 10 is a schematic diagram of a structure of still another communication apparatus according to an embodiment of this application.

Alternatively, for example, the communication apparatus implements the steps of the first network device in the foregoing method embodiment. FIG. 10 is a schematic diagram of a structure of a communication apparatus 100. The communication apparatus 100 includes a processing module 1001 and a transceiver module 1002. The transceiver module 1002 may also be referred to as a transceiver unit, and is configured to implement a sending and/or receiving function. For example, the transceiver module may be a transceiver circuit, a transceiver, or a communication interface.

The transceiver module 1002 may include a receiving module and a sending module, which are respectively configured to perform receiving and sending steps performed by the first network device in the foregoing method embodiment. The processing module 1001 may be configured to perform steps other than the receiving and sending steps performed by the first network device in the foregoing method embodiment.

The transceiver module 1002 is configured to receive a first report from a terminal device, where the first report includes one or more target reports. The processing module 1001 is configured to process the first report.

Optionally, the transceiver module 1002 is further configured to send first information to the terminal device, where the first information is for determining the first report, and a quantity of target reports included in the first report is a second quantity.

Optionally, the transceiver module 1002 is further configured to send request information to the terminal device, where the request information is for requesting the terminal device to send the first report.

Optionally, the transceiver module 1002 is further configured to receive indication information from the terminal device, where the indication information indicates that the terminal device has the target report and/or the quantity of target reports. The transceiver module 1002 is further configured to send request information to the terminal device based on the indication information, where the request information is for requesting the terminal device to send the first report.

All related content of the steps in the foregoing method embodiment may be cited in function descriptions of the corresponding functional modules. Details are not described herein again.

Optionally, the communication apparatus 100 may further include a storage module (not shown in FIG. 10), configured to store data and/or instructions. The processing module 1001 may read the data or the instructions in the storage module, to implement the method corresponding to the foregoing embodiments.

It may be understood that the foregoing modules may be independently disposed, or may be integrated. This is not limited in this embodiment of this application.

In a possible implementation, the communication apparatus 100 is presented in an integrated form of functional modules obtained through division. The module herein may be an ASIC, a circuit, a processor that executes one or more software or firmware programs, a memory, an integrated logic circuit, and/or another component capable of providing the foregoing functions. In a simple embodiment, a person skilled in the art may figure out that the communication apparatus 100 may be in a form of the first network device 30*a* shown in FIG. 5.

For example, the processor 301*a* in the first network device 30*a* shown in FIG. 5 may invoke the computer-executable instructions stored in the memory 302*a*, so that the first network device 30*a* performs the report transmission method according to the foregoing method embodiment.

Specifically, the processor 301*a* in the first network device 30*a* shown in FIG. 5 may invoke the computer-executable instructions stored in the memory 302*a*, to implement functions/implementation processes of the processing module 1001 and the transceiver module 1002 in FIG. 10. Alternatively, the processor 301*a* in the first network device 30*a* shown in FIG. 5 may invoke the computer-executable instructions stored in the memory 302*a*, to implement functions/implementation processes of the processing module 1001 in FIG. 10, and the transceiver 303*a* in the first network device 30*a* shown in FIG. 5 may implement functions/implementation processes of the transceiver module 1002 in FIG. 10.

Because the communication apparatus 100 provided in this embodiment may perform the foregoing report transmission method, for a technical effect that can be achieved by the communication apparatus 100, refer to the foregoing method embodiment. Details are not described herein.

Optionally, an embodiment of this application further provides a communication apparatus (for example, the communication apparatus may be a chip or a chip system). The communication apparatus includes a processor, configured to implement the method according to any one of the foregoing method embodiments. In a possible design, the communication apparatus further includes a memory. The memory is configured to store necessary program instructions and necessary data. The processor may invoke program code stored in the memory, to indicate the communication apparatus to perform the method according to any one of the foregoing method embodiments. Certainly, the communication apparatus may not include a memory. In another possible design, the communication apparatus further includes an interface circuit. The interface circuit is a code/data read/write interface circuit, and the interface circuit is configured to receive computer-executable instructions (where the computer-executable instructions are stored in a memory, and may be directly read from the memory, or may be read via another component) and transmit the computer-executable instructions to the processor. When the communication apparatus is the chip system, the communication apparatus may include a chip, or may include a chip and another discrete component. This is not specifically limited in this embodiment of this application. All or a part of the foregoing embodiments may be implemented by using software, hardware, firmware, or any combination thereof. When a software program is used to implement embodiments, embodiments may be all or partially implemented in a form of a computer program product. The computer program product includes one or more computer instructions. When the computer program instructions are loaded and executed on a computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid-state drive, SSD)), or the like. In embodiments of this application, the computer may include the apparatus described above.

Although this application is described with reference to embodiments, in a process of implementing this application that claims protection, a person skilled in the art may understand and implement another variation of the disclosed embodiments by viewing the accompanying drawings, disclosed content, and appended claims. In the claims, "comprising" does not exclude another component or another step, and "a" or "one" does not exclude a case of multiple. A single processor or another unit may implement several functions enumerated in the claims. Some measures are recorded in dependent claims that are different from each other, but this does not mean that these measures cannot be combined to produce a better effect.

Although this application is described with reference to specific features and embodiments thereof, it is clear that various modifications and combinations may be made to them without departing from the scope of this application. Correspondingly, the specification and accompanying drawings are merely example description of this application defined by the accompanying claims, and are considered as any of or all modifications, variations, combinations, or equivalents that cover the scope of this application. It is clear that a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A report transmission method, comprising:
   determining a quantity of target reports; and
   in response to the quantity of target reports being greater than or equal to a first quantity, sending a first report to a first network device,
   wherein
   the first report comprises one or more target reports,
   a radio link failure-like report,
   the radio link failure-like report is for logging one or more of a first event or a second event,
   the first event means that a quantity of data retransmissions of a terminal device is greater than or equal to a first preset quantity of times and is less than a second preset quantity of times, and
   the second event means that the terminal device performs a handover, and a duration from a moment at which the terminal device receives a handover command to a moment at which the terminal device successfully accesses a target cell is greater than or equal to a first preset duration and is less than a second preset duration.

2. The report transmission method according to claim 1, wherein the target report is logged by the terminal device in a first time period.

3. The report transmission method according to claim 2, further comprising:
   receiving first time information from a second network device, wherein the first time information indicates the first time period.

4. The report transmission method according to claim 3, further comprising:
   receiving first type information from the second network device, wherein the first type information indicates the first type.

5. The report transmission method according to claim 1, wherein a quantity of target reports included in the first report is a second quantity.

6. The report transmission method according to claim 5, further comprising:
   receiving first information from the first network device; and
   determining the first report based on the first information.

7. The report transmission method according to claim 6, wherein the first information comprises the second quantity.

8. The report transmission method according to claim 6, wherein
   the first information comprises second time information, the second time information indicates a second time period, and the second quantity is a quantity of target reports logged by the terminal device in the second time period, and
   the first information comprises second type information, the second type information indicates a second type, and the second quantity is a quantity of target reports of the second type; or
   the first information comprises second time information and second type information, the second type information indicates a second type, the second time information indicates a second time period, and the second quantity is a quantity of target reports of the second type that are logged by the terminal device in the second time period.

9. A report transmission method, comprising:
   obtaining a first quantity, wherein the first quantity is used to configure a terminal device to send a first report in response to a quantity of target reports being greater than or equal to the first quantity, and the first report comprises one or more target reports; and
   sending the first quantity to the terminal device,
   wherein
   a type of the target report is a first type, and the first type comprises a radio link failure-like report, the radio link failure-like report is for logging one or more of a first event or a second event, the first event means that a quantity of data retransmissions of the terminal device is greater than or equal to a first preset quantity of times and is less than a second preset quantity of times, and the second event means that the terminal device performs a handover, and a duration from a moment at which the terminal device receives a handover command to a moment at which the terminal device successfully accesses a target cell is greater than or equal to a first preset duration and is less than second preset duration.

10. The report transmission method according to claim 9, wherein the target report is logged by the terminal device in a first time period.

11. The report transmission method according to claim 10, further comprising:
sending first time information to the terminal device, wherein the first time information indicates the first time period.

12. The report transmission method according to claim 9, further comprising:
sending first type information to the terminal device, wherein the first type information indicates the first type.

13. A communication system, comprising:
a terminal device, wherein
the terminal device is configured to determine a quantity of target reports, and in response to the quantity of target reports being greater than or equal to a first quantity, send a first report to a first network device, wherein the first report comprises one or more target reports, a type of the target report is a first type, and the first type comprises a radio link failure-like report, the radio link failure-like report is for logging one or more of a first event or a second event, the first event means that a quantity of data retransmissions of a terminal device is greater than or equal to a first preset quantity of times and is less than a second preset quantity of times, and the second event means that the terminal device performs a handover, and a duration from a moment at which the terminal device receives a handover command to a moment at which the terminal device successfully accesses a target cell is greater than or equal to a first preset duration and is less than second preset duration; and a second network device configured to send the first quantity to the terminal device.

14. The communication system according to claim 13, wherein the target report is logged by the terminal device in a first time period.

15. The communication system according to claim 14, wherein the terminal device is further configured to receive first time information from the second network device, wherein the first time information indicates the first time period.

16. The communication system according to claim 13, wherein the terminal device is further configured to receive first type information from the second network device, wherein the first type information indicates the first type.

17. The communication system according to claim 13, wherein a quantity of target reports included in the first report is a second quantity.

18. The communication system according to claim 17, wherein the terminal device is further configured to receive first information from the first network device, and determine the first report based on the first information.

19. The communication system according to claim 18, wherein the first information comprises the second quantity.

20. The communication system according to claim 18, wherein
the first information comprises second time information, the second time information indicates a second time period, and the second quantity is a quantity of target reports logged by the terminal device in the second time period, and the first information comprises second type information, the second type information indicates a second type, and the second quantity is a quantity of target reports of the second type; or the first information comprises second time information and second type information, the second type information indicates a second type, the second time information indicates a second time period, and the second quantity is a quantity of target reports of the second type that are logged by the terminal device in the second time period.

* * * * *